US012688002B2

(12) United States Patent
Zhu et al.

(10) Patent No.: US 12,688,002 B2
(45) Date of Patent: Jul. 21, 2026

(54) DEVICE NETWORKING AND AUDIO CHANNEL CONFIGURATION METHOD, AND ELECTRONIC DEVICE

(71) Applicant: HUAWEI TECHNOLOGIES CO., LTD., Shenzhen (CN)

(72) Inventors: Mengbo Zhu, Xi'an (CN); Ming Kuang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 147 days.

(21) Appl. No.: 18/695,703

(22) PCT Filed: Sep. 15, 2022

(86) PCT No.: PCT/CN2022/119141
§ 371 (c)(1),
(2) Date: Mar. 26, 2024

(87) PCT Pub. No.: WO2023/051272
PCT Pub. Date: Apr. 6, 2023

(65) Prior Publication Data
US 2024/0385799 A1     Nov. 21, 2024

(30) Foreign Application Priority Data
Sep. 28, 2021     (CN) .......................... 202111146255.5

(51) Int. Cl.
*G06F 3/16* (2006.01)
*G06F 3/01* (2006.01)
(Continued)

(52) U.S. Cl.
CPC .............. *G06F 3/162* (2013.01); *G06F 3/017* (2013.01); *H04R 3/12* (2013.01); *H04R 5/04* (2013.01);
(Continued)

(58) Field of Classification Search
CPC ........ H04R 3/12; H04R 5/04; H04R 2420/07; G06F 3/017; G06F 3/162; H04S 1/007
See application file for complete search history.

(56) References Cited

U.S. PATENT DOCUMENTS

| | | | | |
|---|---|---|---|---|
| 7,676,044 B2* | 3/2010 | Sasaki | ..................... | H04S 7/302 381/59 |
| 9,360,943 B2* | 6/2016 | Park | ................... | H04N 21/4223 |

(Continued)

FOREIGN PATENT DOCUMENTS

| | | |
|---|---|---|
| CN | 104993813 A | 10/2015 |
| CN | 105718064 A | 6/2016 |

(Continued)

OTHER PUBLICATIONS

Extended European Search Report in European Appln. No. 22874659.0, mailed on Oct. 17, 2024, 7 pages.

*Primary Examiner* — Paul W Huber
(74) *Attorney, Agent, or Firm* — Fish & Richardson P.C.

(57) ABSTRACT

This application provides example device networking and audio channel configuration methods, applied to a system including a first electronic device and at least one audio device. One example method includes sending, by an audio device of the at least one audio device, a networking packet in response to detecting a first gesture. The first electronic device receives the networking packet. The first electronic device establishes a correspondence between the audio device corresponding to the networking packet and an audio channel indicated by a direction corresponding to the first gesture, the established correspondence allowing the audio device corresponding to the networking packet to be configured to play audio of the audio channel indicated by the direction corresponding to the first gesture. The first electronic device establishes a networking connection to the audio device.

20 Claims, 12 Drawing Sheets

(51) Int. Cl.

| | | |
|---|---|---|
| *H04R 3/12* | (2006.01) | |
| *H04R 5/04* | (2006.01) | |
| *H04S 1/00* | (2006.01) | |
| *H04W 76/10* | (2018.01) | |

(52) U.S. Cl.
   CPC ............. *H04S 1/007* (2013.01); *H04W 76/10* (2018.02); *H04R 2420/07* (2013.01)

(56) References Cited

U.S. PATENT DOCUMENTS

| | | | |
|---|---|---|---|
| 2012/0075957 A1 | 3/2012 | De Bruijn | |
| 2015/0264502 A1* | 9/2015 | Aoki ........................ | H04S 7/307 |
| | | | 381/17 |
| 2015/0293599 A1* | 10/2015 | Shih ........................ | G06F 3/017 |
| | | | 345/173 |
| 2015/0381296 A1* | 12/2015 | Jenq ........................ | H04R 5/04 |
| | | | 381/2 |
| 2017/0208414 A1 | 7/2017 | Lee et al. | |
| 2018/0176688 A1* | 6/2018 | Baek ........................ | H04R 5/04 |
| 2021/0037331 A1 | 2/2021 | Tamaki et al. | |
| 2021/0219087 A1* | 7/2021 | Unno ........................ | H04R 5/02 |
| 2022/0329998 A1* | 10/2022 | Arunachalam ..... | H04L 67/1044 |

FOREIGN PATENT DOCUMENTS

| | | |
|---|---|---|
| CN | 105807923 A | 7/2016 |
| CN | 106203380 A | 12/2016 |
| CN | 108307268 A | 7/2018 |

* cited by examiner

User interface 202

Audio device 40

Electronic device 100

Electronic device 70

Gesture detection
module 71

Packet monitoring
module 72

Audio channel
configuration module 73

Audio device 80

Gesture detection module
81

Packet sending module
82

Audio play module
83

DEVICE NETWORKING AND AUDIO CHANNEL CONFIGURATION METHOD, AND ELECTRONIC DEVICE

CROSS-REFERENCE TO RELATED APPLICATIONS

This application is a national stage of International Application No. PCT/CN2022/119141, filed on Sep. 15, 2022, which claims priority to Chinese Patent Application No. 202111146255.5, filed on Sep. 28, 2021. Both of the aforementioned applications are hereby incorporated by reference in their entireties.

TECHNICAL FIELD

This application relates to the field of terminal technologies, and in particular, to a device networking and audio channel configuration method, and an electronic device.

BACKGROUND

As living standards improve, people are pursuing increasingly high audio and video experience. For example, a growing quantity of users set up home theaters at home, and use a plurality of wireless sound boxes to form a multi-sound box surround stereo, to obtain ultimate audio and video experience. Currently, a process of forming a surround stereo with a plurality of devices is generally as follows: The devices are networked first, and then audio channels are allocated to the devices. In the entire process, the user needs to operate applications associated with the devices one by one, and/or perform button operations on the devices one by one. The operation is complex. Currently, there is no easy-to-operate device networking and audio channel configuration method.

SUMMARY

In view of this, embodiments of this application provide a device networking and audio channel configuration method. With the use of a gesture recognition technology, a user only needs to wave toward audio devices once one by one, and device networking and audio channel configuration can be completed. The user operation is simple, requires low learning costs, and is less error-prone.

A first aspect of embodiments of this application provides a device networking and audio channel configuration method, applied to a system including a first electronic device and at least one audio device. The method includes: The audio device sends a networking packet in response to detecting a first gesture. The first electronic device receives the networking packet. The first electronic device establishes a correspondence between the audio device corresponding to the networking packet and an audio channel indicated by a direction corresponding to the first gesture, so that the audio device corresponding to the networking packet is configured to play audio of the audio channel indicated by the direction corresponding to the first gesture. The first electronic device establishes a networking connection to the audio device.

With the use of the method provided in the first aspect of embodiments of this application, the audio device may send the networking packet when detecting the first gesture. The first electronic device that receives the networking packet may learn of a device identifier of the audio device based on the networking packet. The first electronic device establishes, based on the direction corresponding to the first gesture, the correspondence between the audio channel corresponding to the direction and the audio device, and completes establishment of the networking connection to the audio device. In the entire process, the user only needs to make the first gesture toward the audio device, and device networking and audio channel configuration can be conveniently completed. This simplifies an operation procedure and improves user experience.

According to the first aspect, in some embodiments, the first gesture is a gesture of waving by a user toward the audio device, and the method further includes; The first electronic device determines the direction corresponding to the first gesture. In other words, the first electronic device determines the direction corresponding to the first gesture, so that the first electronic device may learn of, based on a correspondence between the direction and an audio channel, a specific audio channel to be configured for the audio device corresponding to the subsequently received networking packet.

According to the first aspect, in some embodiments, that the first electronic device determines the direction corresponding to the first gesture specifically includes: The first electronic device determines the direction corresponding to the first gesture through gesture recognition. Additionally/alternatively, before the first electronic device establishes the correspondence, the first electronic device sends prompt information that is used to prompt the user to wave toward the audio device. The first electronic device determines the direction corresponding to the first gesture based on the prompt information. In some embodiments, gesture recognition may be implemented by using an ultrasonic gesture recognition technology. In some embodiments, gesture recognition may be implemented by using an image recognition technology. This is not limited in embodiments of this application. Additionally/alternatively, the first electronic device may determine, based on the prompt information previously sent by the first electronic device, that an audio channel corresponding to a waving direction indicated by the prompt information should be configured for the audio device corresponding to the subsequently received networking packet. In this way, the first electronic device may determine the direction corresponding to the first gesture.

According to the first aspect, in some embodiments, the audio device includes a speaker and a microphone, the speaker is configured to send an ultrasonic wave, the microphone is configured to receive an ultrasonic echo corresponding to the ultrasonic wave, and that the audio device detects a first gesture specifically includes: The audio device detects the first gesture based on the ultrasonic wave and the ultrasonic echo according to a Doppler frequency shift principle. As an electronic device configured to play audio, the audio device usually includes a speaker and a microphone. Therefore, a waving gesture approaching the audio device may be recognized based on an ultrasonic wave by using capabilities of the speaker and the microphone. The Doppler frequency shift principle is specifically as follows: If a frequency of the ultrasonic echo is higher than that of the ultrasonic wave, it indicates that an object is approaching; or if the frequency of the ultrasonic echo is lower than that of the ultrasonic wave, it indicates that an object is moving away. In this way, when the user waves toward the audio device, the audio device may detect the waving gesture according to the Doppler frequency shift principle.

According to the first aspect, in some embodiments, the first electronic device and the audio device are located in a same local area network, and that the audio device sends a networking packet specifically includes: The audio device broadcasts the networking packet in the local area network. In this way, audio devices located in the same local area network may detect, through monitoring, the networking packet. In some embodiments, before the method provided in embodiments of this application is applied, the first electronic device and the audio device may be first connected to a same local area network, for example, connected to a same Wi-Fi network.

According to the first aspect, in some embodiments, the method further includes: The first electronic device sends to-be-played audio to the audio device through the networking connection. In this way, the audio play device may play the audio.

According to the first aspect, in some embodiments, the networking packet carries a device type identifier and/or an internet protocol IP address of the audio device. In this way, the first electronic device may perform networking negotiation and key exchange with the audio device based on the device type identifier and/or the IP address of the audio device, to complete establishment of the networking connection.

A second aspect of embodiments of this application provides a device networking and audio channel configuration method, applied to a system including at least a first electronic device, a first audio device, and a second audio device. The method includes:

The first audio device broadcasts a first networking packet in response to detecting a first approaching gesture. The first electronic device receives the first networking packet. The first electronic device determines that the first approaching gesture is a gesture toward a first direction, where the first direction corresponds to a first audio channel. The first electronic device establishes a correspondence between the first audio device and the first audio channel, so that the first audio device is configured to play audio of the first audio channel. The first electronic device establishes a first networking connection to the first audio device.

The second audio device broadcasts a second networking packet in response to detecting a second approaching gesture. The first electronic device receives the second networking packet. The first electronic device determines that the second approaching gesture is a gesture toward a second direction, where the second direction corresponds to a second audio channel. The first electronic device establishes a correspondence between the second audio device and the second audio channel, so that the second audio device is configured to play audio of the second audio channel. The first electronic device establishes a second networking connection to the second audio device.

With the use of the method provided in the second aspect of embodiments of this application, at least two audio channels can be configured. In the entire operation process, the user only needs to separately make approaching gestures toward the first audio device and the second audio device, and device networking and audio channel configuration can be automatically completed. The operation is simple, and user experience is good.

According to the second aspect, in some embodiments, the method further includes: The first electronic device sends the audio of the first audio channel to the first audio device through the first networking connection. The first electronic device sends the audio of the second audio channel to the second audio device through the second networking connection. In other words, in this implementation, the first electronic device directly sends to-be-played audio of an audio channel to an audio device that should play the audio of the audio channel, and the audio device may directly play received audio.

According to the second aspect, in some embodiments, the method further includes: The first electronic device sends a first indication message to the first audio device, where the first indication message indicates the first audio device to play the audio of the first audio channel. The first electronic device sends a second indication message to the second audio device, where the second indication message indicates the second audio device to play the audio of the second audio channel. In other words, in this implementation, the first audio device and the second audio device record their respective audio of audio channels that should be played, so that if audio of a plurality of audio channels is received, the audio of the audio channels that should be played may be selected for playing.

According to the second aspect, in some embodiments, when the first audio device is placed on a left side of the first electronic device and the second audio device is placed on a right side of the first electronic device, the first approaching gesture is a gesture of waving toward the first audio device, the second approaching gesture is a gesture of waving toward the second audio device, the first direction is left, the second direction is right, the first audio channel is a left audio channel, and the second audio channel is a right audio channel. In this way, the left audio channel and the right audio channel can be configured.

A third aspect of embodiments of this application provides an electronic device. The electronic device is configured to: detect a waving gesture, and monitor whether a networking packet in a preset format exists in a local area network; and when a first networking packet conforming to the preset format is received after a waving gesture toward a first direction is detected, configure an electronic device that sends the first networking packet to play audio of a first audio channel, where the first audio channel is an audio channel corresponding to the first direction.

A fourth aspect of embodiments of this application provides an audio device. The audio device is configured to: detect an approaching gesture, and broadcast a networking packet in a preset format after the approaching gesture is detected; establish a networking connection to an electronic device that receives the networking packet in the preset format; and receive audio of a first audio channel sent by the electronic device, and play the audio of the first audio channel.

A fifth aspect of embodiments of this application provides a computer-readable storage medium. The computer-readable storage medium stores instructions, and when the instructions are executed in an electronic device, the electronic device is enabled to configure, when a networking packet conforming to a preset format is received after a waving gesture toward a first direction is detected, a sending device of the networking packet to play audio of a first audio channel, where the first audio channel is an audio channel corresponding to the first direction.

A sixth aspect of embodiments of this application provides a computer program product. The computer program product includes instructions, and when the instructions are executed in an electronic device, the electronic device is enabled to configure, when a networking packet conforming to a preset format is received after a waving gesture toward a first direction is detected, a sending device of the networking packet to play audio of a first audio channel, where the first audio channel is an audio channel corresponding to the first direction.

DESCRIPTION OF EMBODIMENTS

Figure 1:
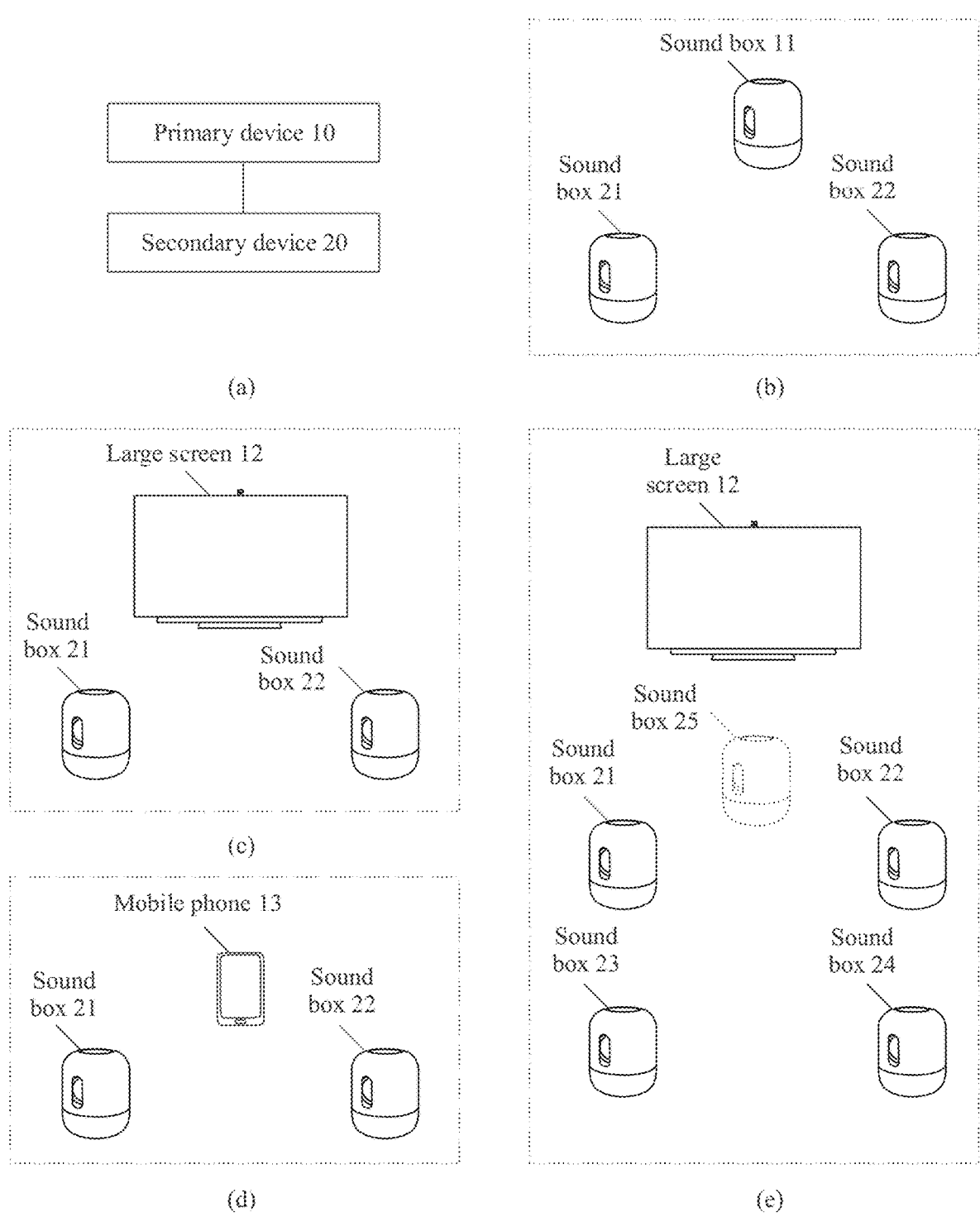
FIG. 1 is a schematic diagram of scenarios in which a plurality of devices form a surround stereo according to an embodiment of this application.
Figure 2A:
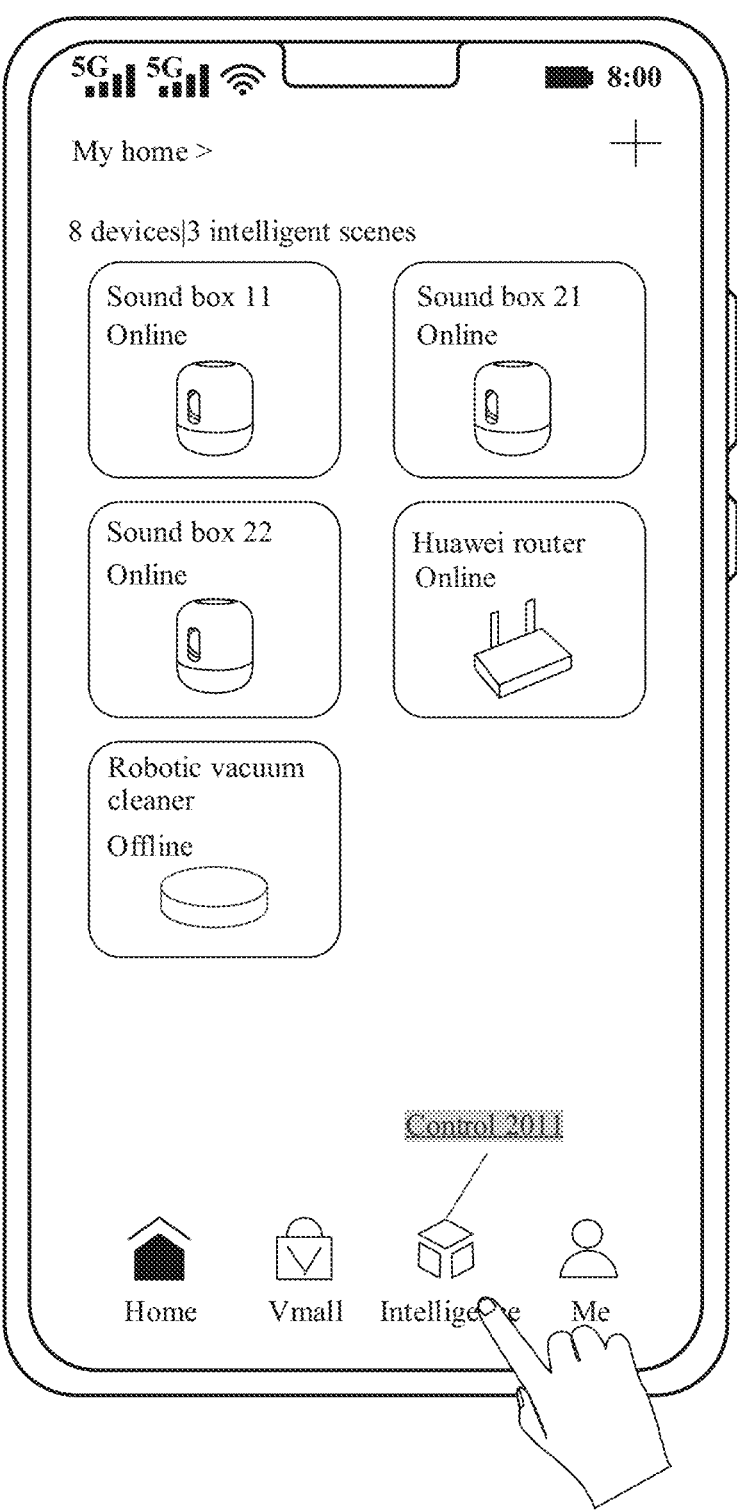
FIG. 2(*a*) to FIG. 2(*f*) are diagrams of user interfaces in a process of device networking and audio channel configuration according to an embodiment of this application.
Figure 2B:
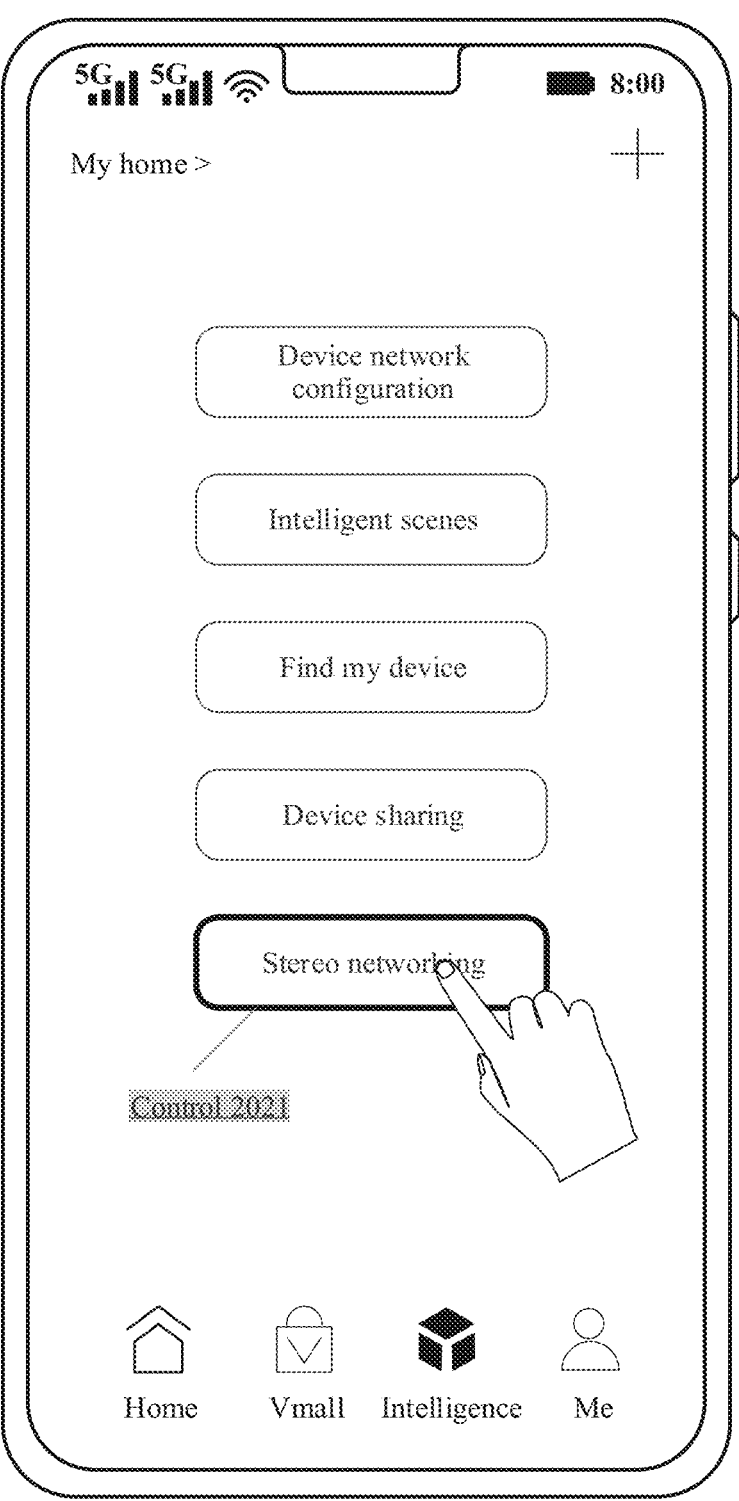
Figure 2C:
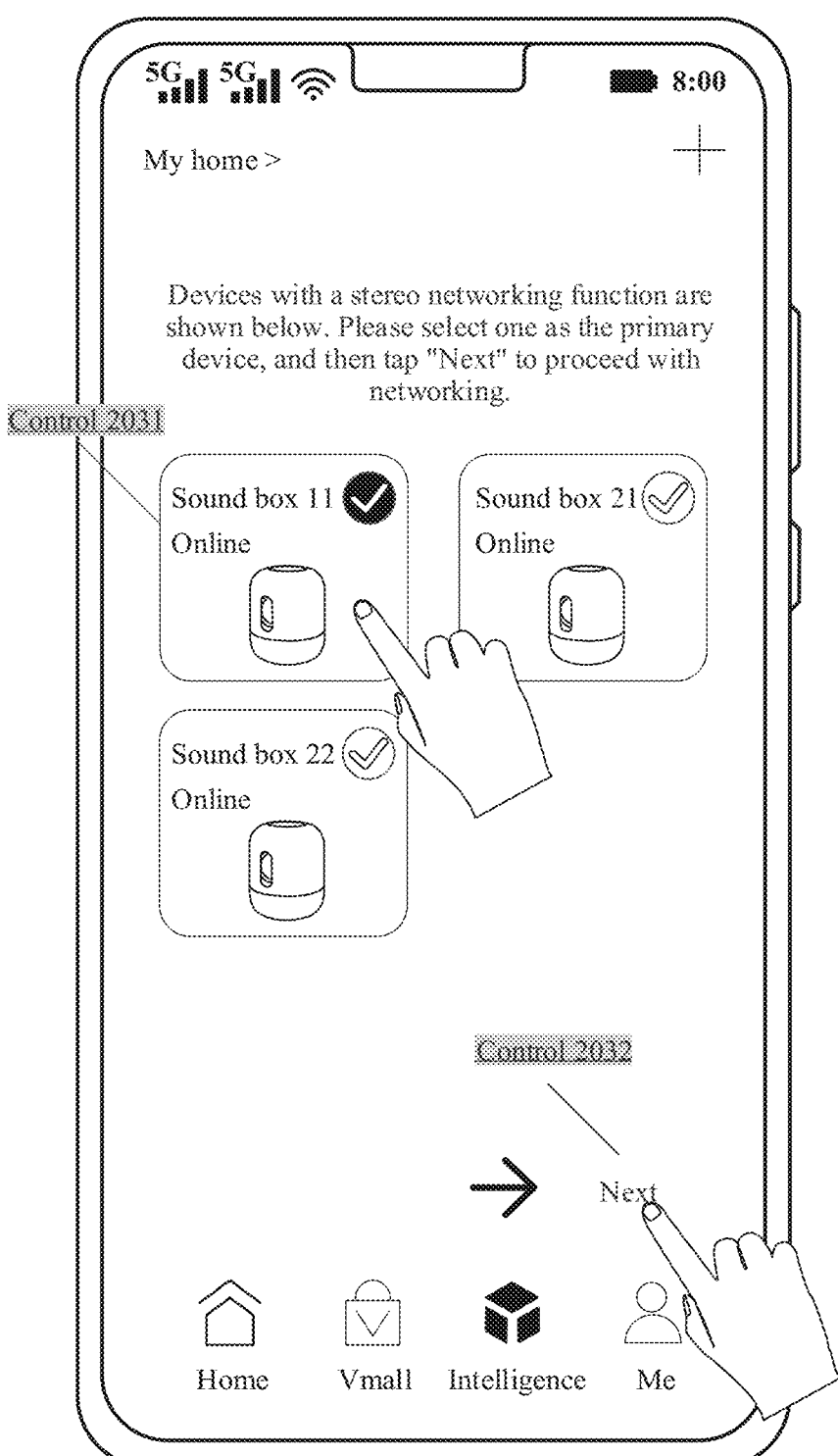
Figure 2D:
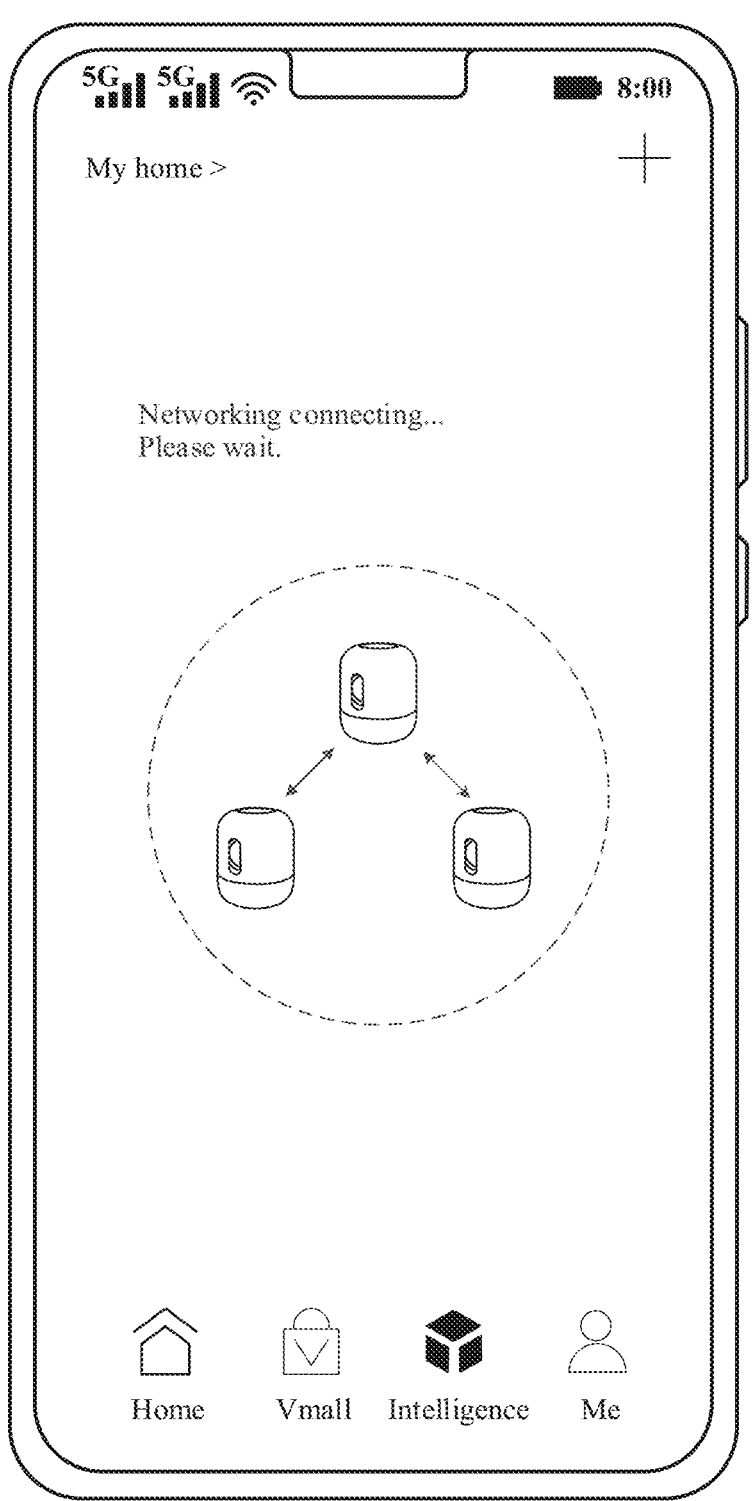
Figure 2E:
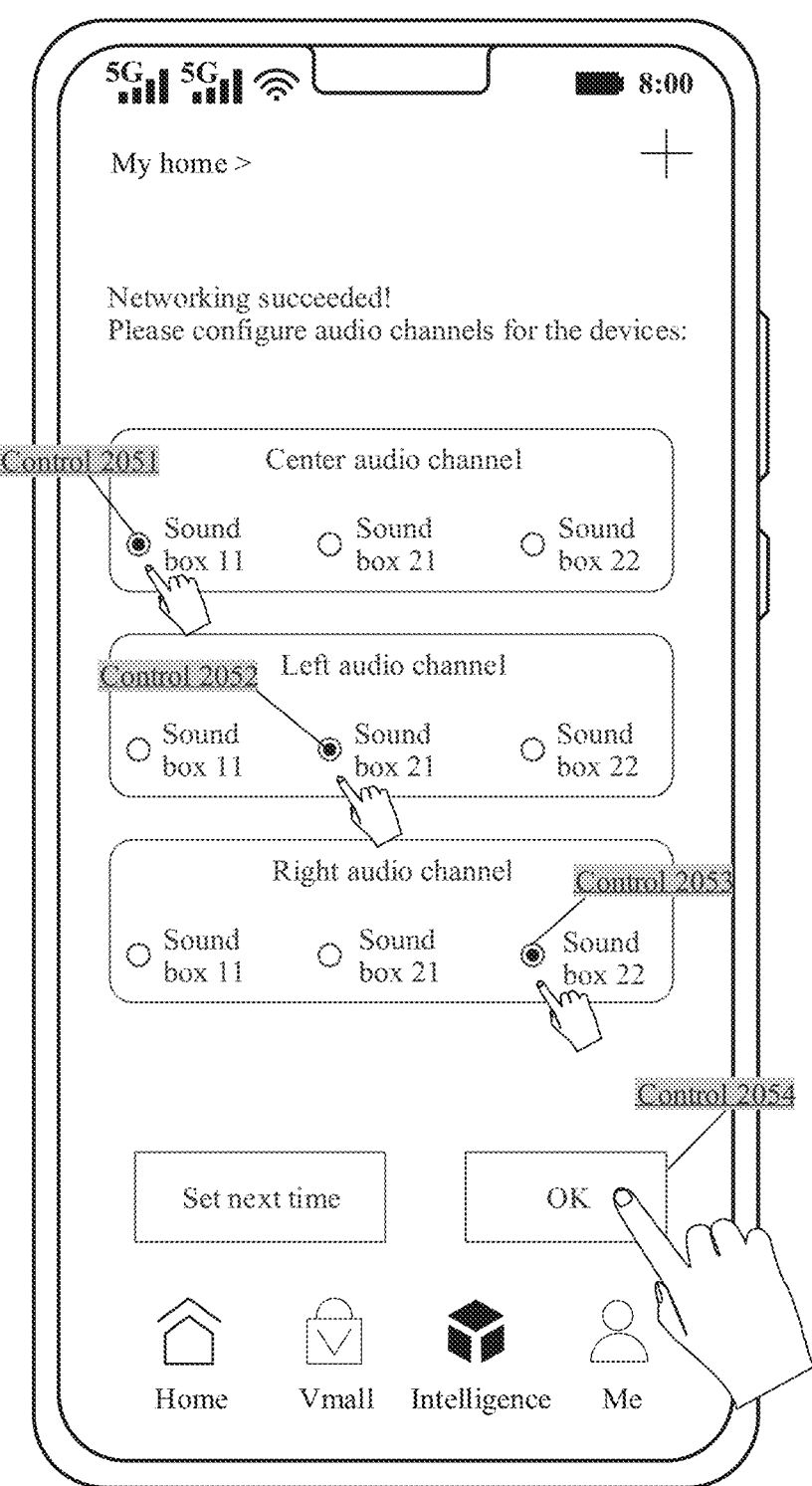
Figure 2F:
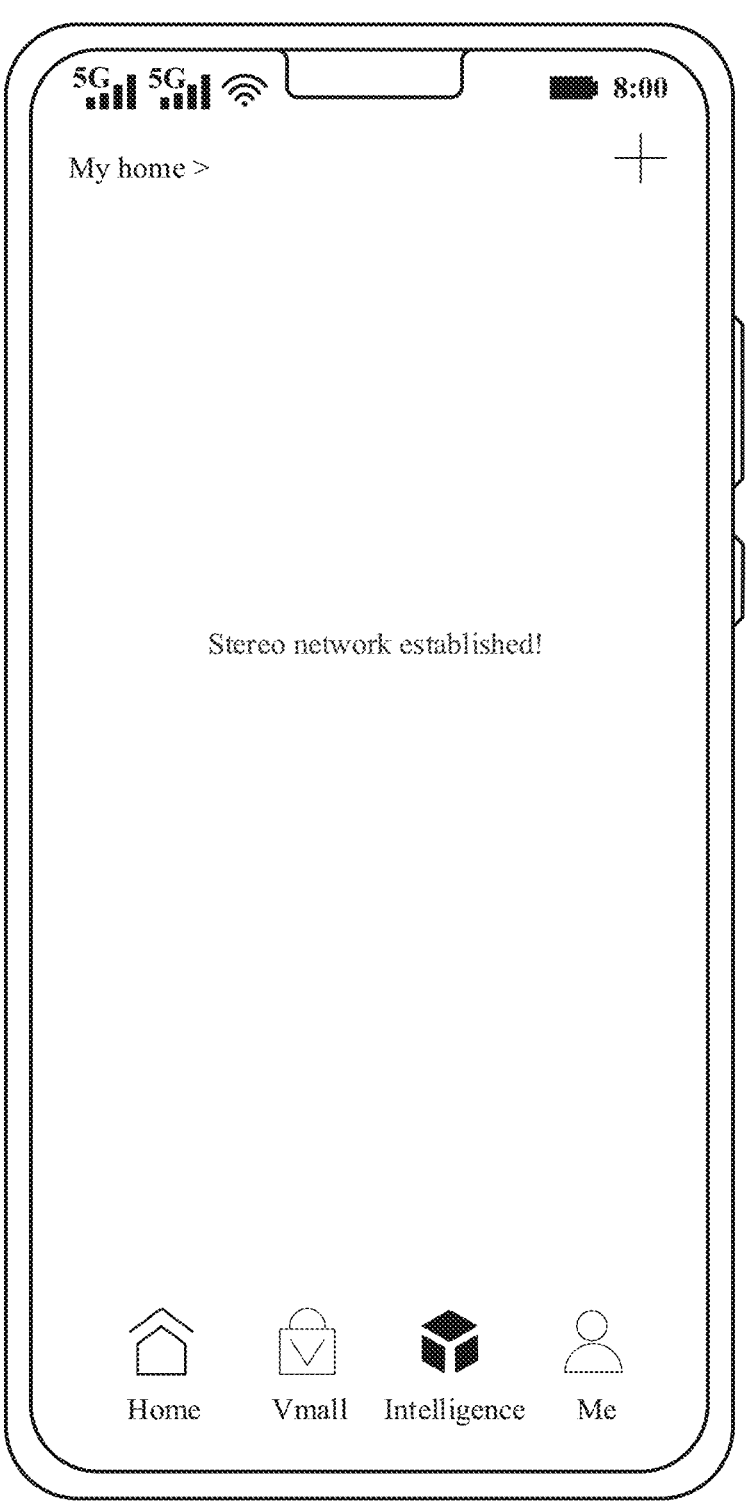

In the following descriptions, for illustration instead of limitation, details such as a particular system structure and a particular technology are provided for thorough understanding of embodiments of this application. However, a person skilled in the art should know that this application may also be implemented in other embodiments without these details. In other cases, detailed descriptions about well-known systems, apparatuses, circuits, and methods are omitted, to prevent unnecessary details from obscuring descriptions of this application.

It should be understood that, when used in the specification and the appended claims of this application, the term "include" indicates existence of a described feature, entirety, step, operation, element, and/or component, but does not exclude existence or addition of one or more other features, entireties, steps, operations, elements, components, and/or sets thereof.

It should also be understood that the term "and/or" used in the specification and the appended claims of this application indicates any combination and all possible combinations of one or more associated listed items, and includes these combinations.

As used in the specification and the appended claims of this application, the term "if" may be interpreted as "when" or "once" or "in response to determining" or "in response to detecting" depending on the context. Similarly, the phrase "if it is determined that" or "if (a described condition or event) is detected" may be interpreted as a meaning of "once it is determined that" or "in response to determining" or "once (a described condition or event) is detected" or "in response to detecting (a described condition or event)" depending on the context.

In addition, in the descriptions of the specification and the appended claims of this application, the terms "first", "second", "third", and the like are merely used to distinguish between descriptions, but cannot be understood as an indication or an implication of relative importance.

Reference to "an embodiment", "some embodiments", or the like described in the specification of this application indicates that one or more embodiments of this application include a specific feature, structure, or characteristic described with reference to the embodiments. Therefore, the expressions such as "in an embodiment", "in some embodiments", "in some other embodiments", and "in other embodiments" that appear at different places in this specification do not necessarily mean reference to a same embodiment. Instead, the expressions mean "one or more but not all of embodiments", unless otherwise specifically emphasized in another manner. The terms "include", "comprise", "have", and their variants all mean "include but are not limited to", unless otherwise specifically emphasized in another manner.

First, with reference to the accompanying drawings, scenarios in which a plurality of devices form a surround stereo according to an embodiment of this application are described.

FIG. 1 is a schematic diagram of examples of scenarios in which a plurality of devices form a surround stereo according to an embodiment of this application. In some embodiments, as shown in FIG. 1(*a*), a scenario in which a plurality of devices form a surround stereo may include one primary device 10 and one or more secondary devices 20. The primary device 10 and/or the secondary device 20 may be an audio device. The audio device is a device that can play audio.

The primary device 10 may be connected to the secondary device 20 to form a stereo network. Alternatively, the primary device 10 and the secondary device 20 may be located in a same local area network to form a stereo network.

Optionally, the primary device 10 may be further connected to an audio source device (not shown in FIG. 1). The primary device 10 may receive an audio file sent by the audio source device. The audio source device may be a terminal device such as a mobile phone, a tablet, or a large screen, or may be a device such as a server or a home hub. A type of the audio source device is not limited in embodiments of this application. Alternatively, the primary device 10 locally stores an audio file, and in this case, the primary device 10 is an audio source device.

In some embodiments, the primary device 10 receives the audio file sent by the audio source device or reads the audio file locally stored in the primary device 10, and then sends the audio file to each secondary device 20, so that each secondary device 20 selects, based on an audio channel configuration parameter, one channel of audio of an audio channel corresponding to the secondary device 20 for playing.

In some other embodiments, after receiving the audio file sent by the audio source device or reading the audio file locally stored in the primary device 10, the primary device 10 first performs audio channel splitting to obtain a plurality of channels of audio, and then sends each channel of audio to a corresponding secondary device 20 based on an audio channel configuration parameter, so that each secondary device 20 receives and plays one channel of audio sent by the primary device 10.

For example, a scenario in which a plurality of devices form a surround stereo shown in FIG. 1(*b*) may include a sound box 11, a sound box 21, and a sound box 22. With reference to the foregoing description of (a) in FIG. 1, the sound box 11 may be used as the primary device 10 in the stereo network, the sound box 21 and the sound box 22 may be used as the secondary devices 20 in the stereo network, and the sound box 11 is connected to both the sound box 21 and the sound box 22 or establishes transmission links to both the sound box 21 and the sound box 22. In an implementation, the sound box 11 may play audio of a center audio channel, the sound box 21 may play audio of a left audio channel, and the sound box 22 may play audio of a right audio channel.

For example, FIG. 1(*c*) and FIG. 1(*d*) respectively show scenarios in which a plurality of devices form a surround stereo when the primary device 10 is a large screen 12 and a mobile phone 13. In this case, the large screen 12 or the mobile phone 13 may be used as the primary device 10 in the stereo network, a sound box 21 and a sound box 22 may be used as the secondary devices 20 in the stereo network, and the large screen 12 or the mobile phone 13 is connected to both the sound box 21 and the sound box 22. The sound box 21 may play audio of a left audio channel, and the sound box 22 may play audio of a right audio channel. In an implementation, the large screen 12 or the mobile phone 13 may not play audio. In another implementation, the large screen 12 or the mobile phone 13 may play audio of a center audio channel or audio of a bass audio channel. In still another implementation, the large screen 12 or the mobile phone 13 includes at least two microphones respectively located on a left side and a right side of the large screen 12 or the mobile phone 13. In this case, the left microphone of the large screen 12 or the mobile phone 13 may play audio of a left audio channel, and the right microphone may play audio of a right audio channel.

It can be learned that the "primary device 10" in the scenario in which the plurality of devices form the surround stereo according to this embodiment of this application is mainly configured to form a stereo network with the secondary device 20 and send an audio file to the secondary device 20. The primary device 10 may play audio or may not play audio. The secondary device 20 is configured to play audio. For example, when the primary device 10 is the mobile phone 13, a user may be using the mobile phone 13 to browse a web page and chat with a friend, and the user only expects the mobile phone 13 to provide an audio file for the secondary device 20, but does not expect the mobile phone 13 to play audio together. In other words, the primary device 10 is not necessarily an audio device, and does not necessarily play audio together with the secondary device 20.

For example, a scenario in which a plurality of devices form a surround stereo shown in FIG. 1(*e*) may include a large screen 12, a sound box 21, a sound box 22, a sound box 23, and a sound box 24. The sound box 21, the sound box 22, the sound box 23, and the sound box 24 may respectively play audio of a front-left audio channel, a front-right audio channel, a rear-left audio channel, and a rear-right audio channel. Similar to FIG. 1(*c*) and FIG. 1(*d*), the large screen 12 in FIG. 1(*e*) may play audio or may not play audio. Optionally, the scenario shown in FIG. 1(*e*) may further include a sound box 25, and the sound box 25 may play audio of a center audio channel or bass audio. For other features of the scenario shown in FIG. 1(*e*), refer to the foregoing descriptions. Details are not described herein again.

It should be understood that a quantity of audio channels in a scenario in which a plurality of devices form a surround stereo is not limited in embodiments of this application, and there may be more or fewer audio channels than those in the scenarios shown in FIG. 1. The method and the electronic device provided in this embodiment of this application may be applied to a plurality of scenarios such as dual-channel, three-channel, four-channel, 5.1-channel, and 7.1-channel.

It should be understood that "send" in this embodiment of this application may mean that a device A directly performs sending to a device B, or may mean that the device A performs sending to the device B through forwarding by another device. The another device may be a device such as a router, a home hub, or a server.

It should be understood that the "connection" in this embodiment of this application may be a wireless connection or a wired connection. The wireless connection may include a manner such as Wi-Fi, Wi-Fi P2P, Bluetooth, near field communication (near field communication. NFC), or ZigBee. The wired connection may include a manner such as a universal serial bus (universal serial bus, USB), a high-definition multimedia interface (high definition multimedia interface, HDMI), power line communication (power line communication, PLC), or a home bus system (home bus system, HSB).

In some embodiments, device networking needs to be first performed, and then audio channels need to be configured, so as to play audio by using the surround stereo formed by the plurality of devices shown in FIG. 1. Next, the scenario in which the plurality of devices form the surround stereo shown in FIG. 1(*b*) is used as an example to describe a process of device networking and audio channel configuration with reference to FIG. 2(*a*) to FIG. 2(*f*).

FIG. 2(*a*) to FIG. 2(*f*) are diagrams of examples of user interfaces in a process of device networking and audio channel configuration according to an embodiment of this application.

For example, the user interfaces shown in FIG. 2(*a*) to FIG. 2(*f*) may be interfaces displayed by a mobile phone of a user.

In some embodiments, a user interface 201 shown in FIG. 2(*a*) may be a home screen of an AI Life application (application. APP) installed on the mobile phone, and the user interface 201 may display an intelligent device bound to a logged-in account of the mobile phone of the user. For example, it is assumed that the logged-in account of the mobile phone of the user is a Huawei account A, and the sound box 11, the sound box 21, the sound box 22, a Huawei router, and a robotic vacuum cleaner are all bound to the Huawei account A. In this case, the user interface 201 shown in FIG. 2(*a*) may display a diagram or a device name corresponding to the device bound to the Huawei account A. Optionally, the user interface 201 may further display a state of each device, for example, "Online", "Offline", or "Connecting". "Online" may be a state in which a device may communicate with a server or the mobile phone of the user, and the user may control the device in the online state or obtain status information of the device by using the mobile phone. "Offline" may be a state in which a device cannot communicate with a server or the mobile phone of the user, and the user cannot control the device in the offline state or obtain status information of the device by using the mobile phone. For example, as shown in FIG. 2(*a*), the sound box 11, the sound box 21, the sound box 22, and the Huawei router are in the online state, and the robotic vacuum cleaner is in the offline state. In some embodiments, when the user taps an "Intelligence" control 2011 in the user interface 201 shown in FIG. 2(*a*), the user interface 201 may jump to a user interface 202 shown in FIG. 2(*b*).

In some embodiments, the user interface 202 shown in FIG. 2(*b*) may display one or more functions provided by the AI Life app, for example, device network configuration, intelligent scenes, find my device, device sharing, and stereo networking. In some embodiments, when the user taps a "Stereo networking" control 2021 in the user interface 202 shown in FIG. 2(*b*), the user interface 202 may jump to a user interface 203 shown in FIG. 2(*c*), to start a stereo networking procedure.

In some embodiments, the user interface 203 shown in FIG. 2(*c*) may display a device that is displayed in the user interface 201 and that has a stereo networking function. For example, the sound box 11, the sound box 21, and the sound box 22 have a stereo networking function, and the user interface 203 displays the three devices. The Huawei router and the robotic vacuum cleaner have no stereo networking function, and the user interface 203 does not display the three devices. In some embodiments, the mobile phone of the user may obtain a capability of each device from the server, to learn of devices having a stereo networking function, and display a device that has a stereo networking function and that is bound to the Huawei account A in the user interface 203. In some embodiments, the user interface 203 may further include prompt information, to prompt the user to select a primary device, so that the user selects one device from the sound box 11, the sound box 21, and the sound box 22 as the primary device based on the prompt information. In some embodiments, as shown in FIG. 2(*c*), the user may tap a control 2031 corresponding to the sound box 11, and in response to the tap of the user, the control 2031 corresponding to the sound box 11 changes from an unselected state to a selected state. Then, the user may tap a "Next" control 2032, and the user interface 203 jumps to a user interface 204 shown in FIG. 2(*d*).

Optionally, before displaying the user interface 203, the mobile phone may further display a user interface for the user to first select a device to perform stereo networking. For example, in the user interface, the user may select the sound box 11, the sound box 21, and the sound box 22 as devices to perform stereo networking. After the user selects the devices to perform stereo networking, the mobile phone displays the user interface 203, so that the user further selects, from the devices previously selected to perform stereo networking, a primary device.

In some embodiments, the user interface 204 shown in FIG. 2(*d*) may display prompt information, to prompt the user that a networking connection is currently being established. Because the user selects the sound box 1I as the primary device in the user interface 203, when the sound box 11, the sound box 21, and the sound box 22 perform networking, the sound box 11 establishes connections or transmission links to both the sound box 21 and the sound box 22. The sound box 11 is used as the primary device, and the sound box 21 and the sound box 22 are used as secondary devices. In some embodiments, when performing networking, the sound box 11, the sound box 21, and the sound box 22 may report status information of current networking of the sound box 11, the sound box 21, and the sound box 22, so that the mobile phone of the user may display the user interface 204. In some embodiments, after networking of the sound box 11, the sound box 21, and the sound box 22 is completed, status information of the completed networking may be reported, so that the user interface 204 may jump to a user interface 205 shown in FIG. 2(*e*), to start an audio channel configuration procedure.

In some embodiments, the user interface 205 shown in FIG. 2(*e*) may display prompt information, to prompt the user to select a corresponding audio channel for each device. For example, because three devices perform stereo networking this time, three audio channels may be configured by default, for example, corresponding devices are configured for a center audio channel, a left audio channel, and a right audio channel. In some embodiments, as shown in FIG. 2(*e*), the user may tap a control 2051 to configure the sound box 11 as a device to play audio of the center audio channel; the user may tap a control 2052 to configure the sound box 21 as a device to play audio of the left audio channel; and the user may tap a control 2053 to configure the sound box 22 as a device to play audio of the right audio channel. Then, the user may tap an "OK" control 2054, and in response to the tap of the user, the user interface 205 may jump to a user interface 206 shown in FIG. 2(*f*). Alternatively, in the user interface 205, the user may not configure audio channels, but tap "Set next time", and subsequently configure audio channels. In some embodiments, in response to tapping "Set next time" or the "OK" control 2054 by the user, the user interface 205 may jump to the user interface 206 shown in FIG. 2(*f*).

In some embodiments, the user interface 206 shown in FIG. 2(*f*) may display prompt information, to prompt the user that a stereo network has been established. In other words, the sound box 11 has established connections or transmission links to both the sound box 21 and the sound box 22, and corresponding audio channels have been configured for the sound box 11, the sound box 21, and the sound box 22.

In the process of device networking and audio channel configuration shown in embodiments in FIG. 2(*a*) to FIG. 2(*f*), the user needs to manually select and determine a specific device as a primary device, and manually configure corresponding audio channels for devices that perform networking. In actual application, device names of the sound box 11, the sound box 21, and the sound box 22 displayed in the user interfaces shown in FIG. 2(*a*) to FIG. 2(*f*) may be very similar. For example, the device name of the sound box 11 is displayed as "Sound X-[product serial number 1]", the device name of the sound box 21 is displayed as "Sound X-[product serial number 2]", and the device name of the sound box 22 is displayed as "Sound X-[product serial number 3]". The product serial number 1 to the product serial number 3 may be strings of mutually different and irregular combinations of letters and numbers. The user needs to check product serial numbers on instructions or packing boxes of the devices one by one, or check serial number labels affixed on the devices, to determine a specific entity device that actually corresponds to a device name displayed in the user interfaces shown in FIG. 2(*a*) to FIG. 2(*f*) and that is placed in physical space in front of the user.

However, a process in which the user determines correspondences between the device names and entity devices one by one is prone to errors, leading to stereo networking disorder or incorrect audio channel configuration. For example, a device that should play audio of the left/right audio channel is configured to play audio of the center audio channel. For another example, a device located on a left side in the physical space is configured to play audio of the right audio channel, and a device located on a right side in the physical space is configured to play audio of the left audio channel.

In some other embodiments, when the device that performs stereo networking includes a functional button, the user may also perform device networking by pressing the functional button. Specifically, the scenario in which the plurality of devices form the surround stereo shown in FIG. 1(*b*) is still used as an example.

Before a stereo networking procedure is started, in some embodiments, the sound box 11, the sound box 21, and the sound box 22 are all bound to a same account. For a method for binding the sound box 11, the sound box 21, and the sound box 22 to a same account, refer to an existing solution. Details are not described in this embodiment of this application again. When the user wants the sound box 11, the sound box 21, and the sound box 22 to perform stereo networking, the user may press functional buttons on the sound box 11, the sound box 21, and the sound box 22. In response to the operation of pressing the functional buttons by the user, the sound box 11, the sound box 21, and the sound box 22 report request messages for requesting to perform stereo networking to the server. In response to the request messages, the server determines that the sound box 11, the sound box 21, and the sound box 22 are all associated with a same account and are all in a same local area network, for example, the sound box 11, the sound box 21, and the sound box 22 are all connected to a same router. The server delivers a stereo networking instruction to the sound box 11, the sound box 21, and the sound box 22. The sound box 11, the sound box 21, and the sound box 22 enter a stereo networking state in response to the stereo networking instruction. In some implementations, if the sound box includes an indicator light, the indicator light may be on or blink to prompt the user that the sound box has entered the stereo networking state. Alternatively, the sound box may play preset audio to prompt the user that the sound box has entered the stereo networking state. In some implementations, the server may use, by default, a sound box whose functional button is first pressed by the user as a primary sound box. For example, if the user first presses the functional button on the sound box 11, and then presses the functional buttons on the sound box 21 and the sound box 22, the server uses, based on a sequence of received request messages, a device corresponding to the first received request message, that is, the sound box 11, as the primary sound box. Further, after the sound box 11, the sound box 21, and the sound box 22 enter the stereo networking state, the sound box 11 establishes connections or transmission links to both the sound box 21 and the sound box 22.

So far, the procedure of performing device networking by using buttons has been completed. Next, audio channels are configured.

In an implementation, a primary sound box in devices that complete networking may play prompt audio one by one, to prompt the user to select a device that is to be configured for each audio channel. Specifically, the scenario in which the plurality of devices form the surround stereo shown in FIG. 1(b) is still used as an example. The sound box 11 (the primary sound box) first plays "Now, please double-click the functional button on the left sound box". After hearing the audio, the user double-clicks the functional button on the sound box 21, and in response to the operation, the sound box 21 sends a packet to the sound box 11, so that the sound box 11 establishes a correspondence between a left audio channel and the sound box 21, that is, the left audio channel is configured for the sound box 21, or the sound box 21 is configured for the left audio channel. Then, the sound box 11 plays "Now, please double-click the functional button on the right sound box". After hearing the audio, the user double-clicks the functional button on the sound box 22, and in response to the operation, the sound box 22 sends a packet to the sound box 11, so that the sound box 11 establishes a correspondence between a right audio channel and the sound box 22, that is, the right audio channel is configured for the sound box 22, or the sound box 22 is configured for the right audio channel.

In the procedure in which an audio channel allocation manner is combined with button networking, the user needs to repeatedly perform button operations for a plurality of times. For example, when three audio channels are configured, the user needs to perform button operations for at least five times, and the entire process is very complex. If a room in which devices forming a surround stereo are located has a large area, and distances between the devices are long, the user needs to go back and forth for a plurality of times and walk a lot to press functional buttons on the devices. This is very inconvenient.

In view of problems such as error-prone and complex operations in the device networking and audio channel configuration method described in the foregoing embodiments, an embodiment of this application provides a device networking and audio channel configuration method, which is implemented by using an ultrasonic gesture recognition technology and/or an ultrasonic ranging technology. With the use of the method, after selecting a primary sound box, the user may wave toward secondary sound boxes once one by one, to complete device networking and audio channel configuration. The user operation is simple, requires low learning costs, and is less error-prone. The device networking and audio channel configuration method provided in this embodiment of this application is described below in detail with reference to the accompanying drawings.

For ease of description, the scenario in which the plurality of audio devices form the surround stereo shown in FIG. 1(b) is still used as an example below to describe the device networking and audio channel configuration method. It should be understood that, a scenario to which the device networking and audio channel configuration method provided in this embodiment of this application may be applied is not limited to the scenario shown in FIG. 1(b) or another scenario in FIG. 1, and the method may be applied to any scenario in which device networking and audio channel configuration need to be performed.

Figure 3:
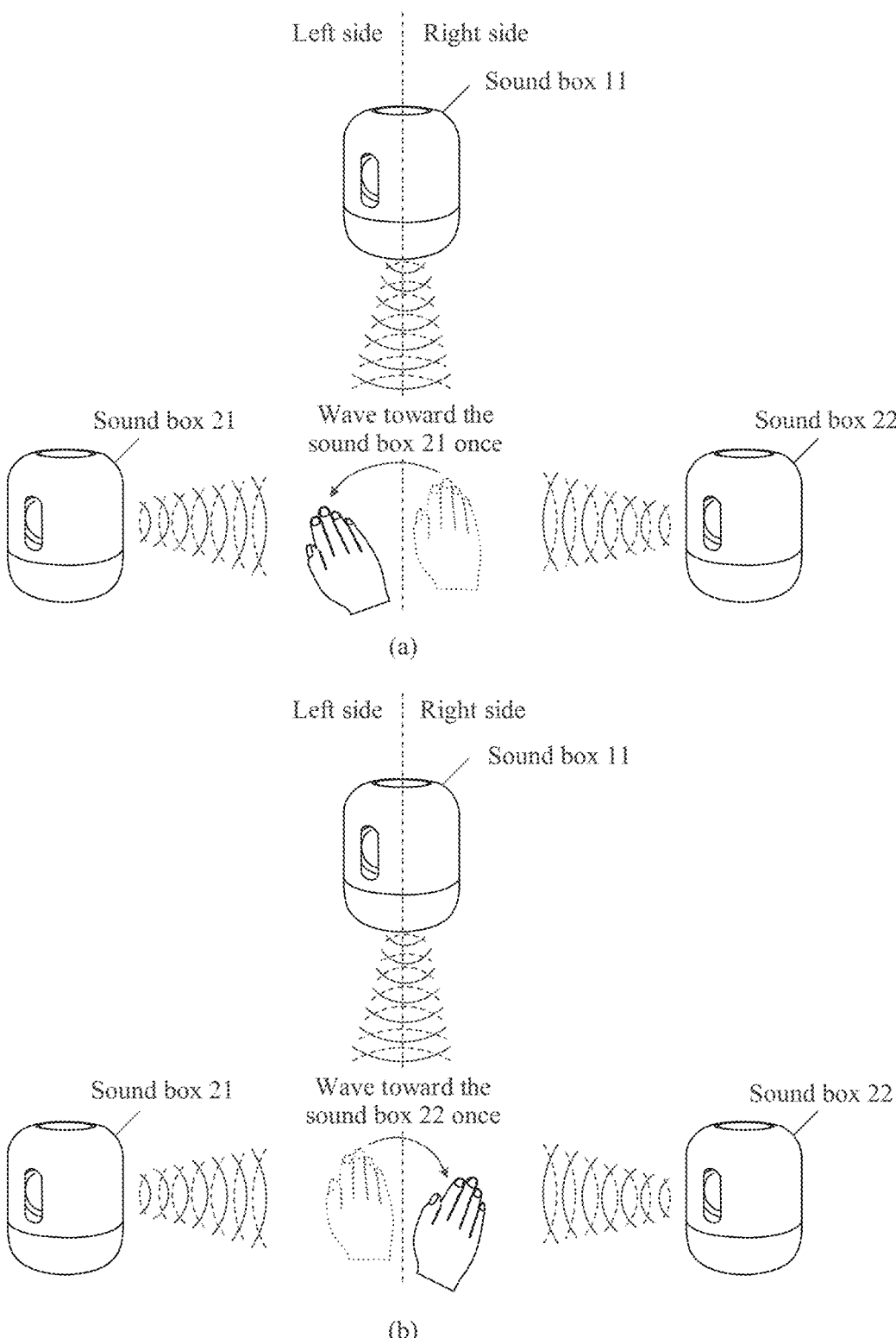
FIG. 3 is a schematic diagram of a device networking and audio channel configuration method according to an embodiment of this application.

FIG. 3 is a schematic diagram of an example of a device networking and audio channel configuration method according to an embodiment of this application.

As shown in FIG. 3, the sound box 11, the sound box 21, and the sound box 22 are approximately placed in a shape of an isosceles triangle, the sound box 11 is located near a vertex angle, and the sound box 21 and the sound box 22 are respectively located near two base angles. An area on a left side of a perpendicular bisector of the isosceles triangle may be understood as a left-side area of the sound box 11, and an area on a right side of the perpendicular bisector of the isosceles triangle may be understood as a right-side area of the sound box 11.

After the primary sound box is selected, for example, after the sound box 11 is selected as the primary sound box, as shown in FIG. 3(a), the user may wave toward the sound box 21 once at a location that is in front of the sound box 11 and that is between the sound box 21 and the sound box 22. The sound box 21 senses, according to a Doppler frequency shift principle by using an ultrasonic wave, that an object is approaching, and the sound box 21 broadcasts a networking packet carrying device information of the sound box 21, so that the sound box 11 receives the networking packet broadcast by the sound box 21, and obtains the device information of the sound box 21. In addition, the sound box 11 detects a gesture of waving leftward by using the ultrasonic gesture recognition technology, and the sound box 11 determines that an audio channel to be configured is a left audio channel. In this way, the sound box 11 establishes a correspondence between the sound box 21 and the left audio channel, and configures the sound box 21 as a play device of the left audio channel. Then, the sound box 11 sends networking information to the sound box 21, and after the sound box 21 receives the networking information sent by the sound box 11, a connection (or a transmission link) is established between the sound box 11 and the sound box 21. The sound box 11 completes configuration of the left audio channel, and completes networking with the audio play device of the left audio channel.

Similarly, for example, as shown in FIG. 3(b), the user may further wave toward the sound box 22 once at a location that is in front of the sound box 11 and that is between the sound box 21 and the sound box 22. The sound box 22 senses, according to the Doppler frequency shift principle by using an ultrasonic wave, that an object is approaching, and the sound box 22 broadcasts a networking packet carrying device information of the sound box 22, so that the sound box 11 receives the networking packet broadcast by the sound box 22, and obtains the device information of the sound box 22. In addition, the sound box 11 detects a gesture of waving rightward by using the ultrasonic gesture recognition technology, and the sound box 11 determines that an audio channel to be configured is a right audio channel. In this way, the sound box 11 establishes a correspondence between the sound box 22 and the right audio channel, and configures the sound box 22 as a play device of the right audio channel. Then, the sound box 11 sends networking information to the sound box 22, and after the sound box 22 receives the networking information sent by the sound box 11, a connection (or a transmission link) is established between the sound box 11 and the sound box 22. The sound box 11 completes configuration of the right audio channel, and completes networking with the audio play device of the right audio channel.

So far, the user only needs to separately wave toward the sound box 21 and the sound box 22 once, and the sound box 11, the sound box 21, and the sound box 22 automatically complete device networking and audio channel configuration. The operation is very simple and intuitive.

Figure 4:
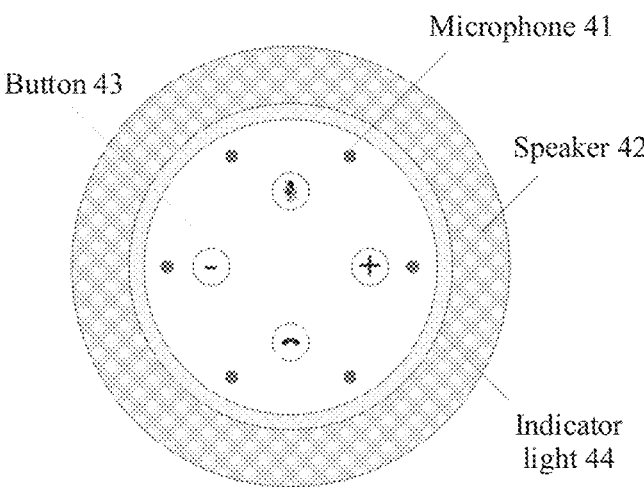
FIG. 4 is a top view of an audio device according to an embodiment of this application.

FIG. 4 is a top view of an example of an audio device according to an embodiment of this application. As shown in FIG. 4, the audio device 40 may be a sound box, and may include one or more microphones 41 and one or more speakers 42, and optionally, may further include one or more buttons 43 and one or more indicator lights 44.

When the audio device 40 plays an audio file of an ultrasonic frequency band, the speaker 42 may send an ultrasonic wave. When the ultrasonic wave sent by the speaker 42 is blocked by an object on a propagation path, the ultrasonic wave is reflected to generate an ultrasonic echo. The microphone 41 may receive the ultrasonic echo. In this way, the audio device 40 may determine, according to a Doppler frequency shift principle by comparing frequencies of the ultrasonic wave sent by the speaker 42 and the ultrasonic echo received by the microphone 41, whether a movement direction of the object relative to the audio device 40 is close to the audio device 40 or away from the audio device 40.

Specifically, the frequency of the ultrasonic wave sent by the speaker 42 is denoted as $f_t$, and the frequency of the ultrasonic echo received by the microphone 41 is denoted as $f_r$. If $f_t < f_r$, the audio device 40 may determine that the movement direction of the object relative to the audio device is close to the audio device 40; or if $f_t > f_r$, the audio device 40 may determine that the movement direction of the object relative to the audio device is away from the audio device 40.

In this way, in embodiments shown in FIG. 3, when the user waves toward the sound box 21 once, the sound box 21 may determine that an object is approaching the sound box 21; and when the user waves toward the sound box 22 once, the sound box 22 may determine that an object is approaching the sound box 22.

When there are a plurality of microphones 41, the plurality of microphones 41 may be arranged in an annular manner to form a microphone array. Each microphone 41 in the microphone array may receive an ultrasonic echo. Because the microphones 41 have different spatial locations, sound wave characteristics (for example, a frequency and a phase) of ultrasonic echoes received by the microphones are also different, so that the audio device 40 may implement accurate gesture recognition based on differences between the sound wave characteristics of the ultrasonic echoes received by the plurality of microphones 41 in the microphone array.

In this way, in embodiments shown in FIG. 3, when the user waves toward the sound box 21 once, the sound box 11 may determine, through gesture recognition, that the user is waving leftward; and when the user waves toward the sound box 21 once, the sound box 11 may determine, through gesture recognition, that the user is waving rightward.

Figure 5:
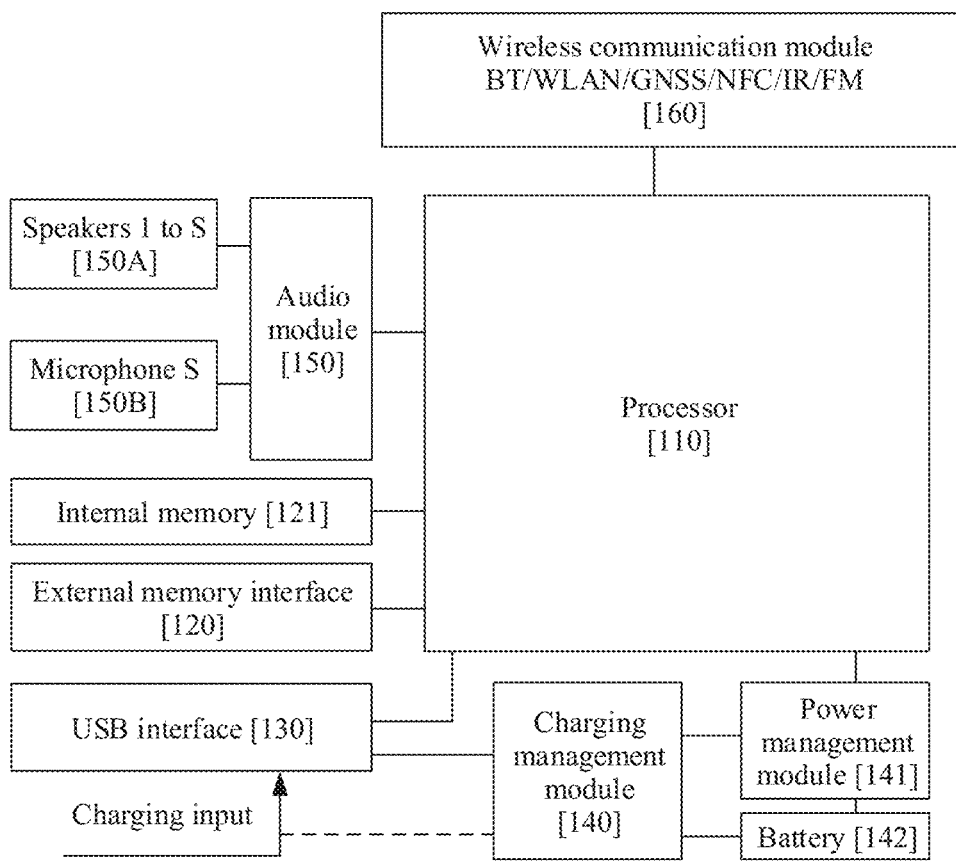
FIG. 5 is a schematic diagram of a structure of an electronic device according to an embodiment of this application.

FIG. 5 is a schematic diagram of an example of a structure of an electronic device 100 according to an embodiment of this application. The electronic device 100 may be the foregoing audio device 40. As shown in FIG. 5, the electronic device 100 may include a processor 110, an external memory interface 120, an internal memory 121, a universal serial bus (universal serial bus, USB) interface 130, a charging management module 140, a power management module 141, a battery 142, an audio module 150, a speaker 150A, a microphone 150B, and a wireless communication module 160.

It may be understood that the structure shown in this embodiment of this application does not constitute a specific limitation on the electronic device 100. In some other embodiments of this application, the electronic device 100 may include more or fewer components than those shown in the figure, or have some components combined, or have some components split, or have a different component arrangement. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors. The controller may be a nerve center and a command center of the electronic device 100. The controller may generate an operation control signal based on instruction operation code and a time sequence signal, to control instruction reading and instruction execution.

A memory may be further disposed in the processor 110, and is configured to store instructions and data. In some embodiments, the memory in the processor 110 is a cache. The memory may store instructions or data that has been recently used or cyclically used by the processor 110. If the processor 110 needs to use the instructions or the data again, the processor may directly invoke the instructions or the data from the memory. This avoids repeated access and reduces waiting time of the processor 110, thereby improving system efficiency.

Performing of the device networking and audio channel configuration method provided in embodiments of this application may be controlled by the processor 110 or completed by invoking another component, for example, invoking instructions or data that is stored in the internal memory 121 and that is used to implement the method provided in embodiments of this application, to implement device networking and audio channel configuration.

In some embodiments, the processor 110 may include one or more interfaces. The interface may include an integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus. USB) interface, and/or the like.

The USB interface 130 is an interface that conforms to a USB standard specification, and may be specifically a mini USB interface, a micro USB interface, a USB type-C interface, or the like. The USB interface 130 may be configured to connect to a charger to charge the electronic device 100, or may be configured to transmit data between the electronic device 100 and a peripheral device, or may be configured to connect to a headset for playing audio by using the headset. Alternatively, the interface may be configured to connect to another electronic device, for example, an AR device.

It may be understood that, an interface connection relationship between the modules shown in this embodiment of this application is merely an example for description, and does not constitute a limitation on the structure of the electronic device 100. In some other embodiments of this application, the electronic device 100 may alternatively use an interface connection manner different from that in the foregoing embodiment, or use a combination of a plurality of interface connection manners.

The wireless communication module 160 may provide a wireless communication solution that is applied to the electronic device 100 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communication processing module.

The external memory interface 120 may be configured to connect to an external memory card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code, and the executable program code includes instructions. The internal memory 121 may include a program storage region and a data storage region. The program storage region may store an operating system, an application required by at least one function (for example, a sound play function and an image play function), and the like. The data storage region may store data (for example, audio data and a phone book) and the like created during use of the electronic device 100. In addition, the internal memory 121 may include a high-speed random access memory, and may further include a nonvolatile memory, for example, at least one magnetic disk storage device, a flash storage device, or a universal flash storage (universal flash storage, UFS). The processor 110 runs the instructions stored in the internal memory 121 and/or the instructions stored in the memory disposed in the processor, to perform various function applications and data processing of the electronic device 100.

The electronic device 100 may use the audio module 150, the speaker 150A, the microphone 150B, the application processor, and the like to implement an audio function, for example, music play and recording. In some embodiments, the electronic device 100 may include one or S speakers 150A. In addition, the electronic device 100 may further include S microphones 150B, where S is a positive integer greater than 1.

Figure 6A:
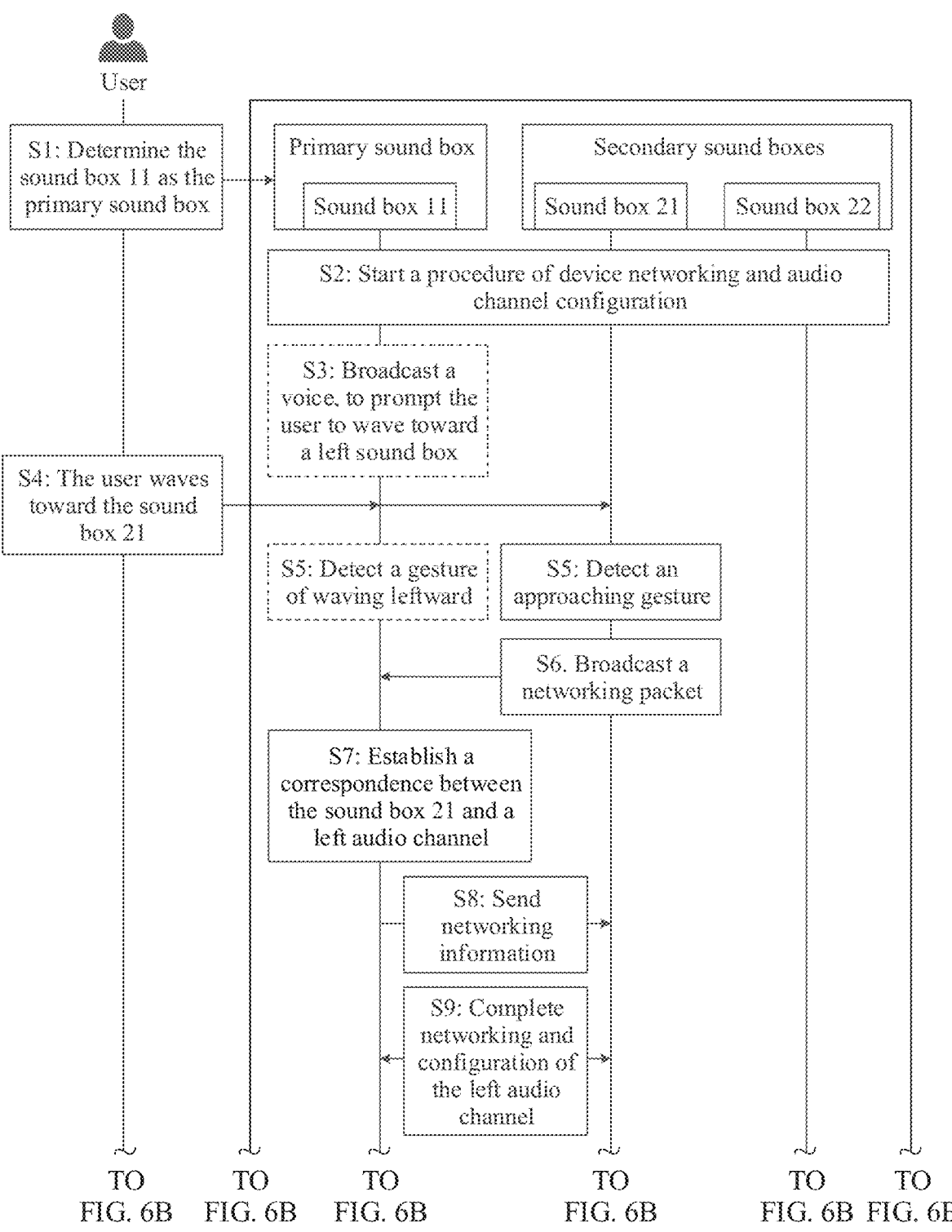
FIG. 6A and FIG. 6B are a diagram of device interaction in a device networking and audio channel configuration method according to an embodiment of this application.
Figure 6B:
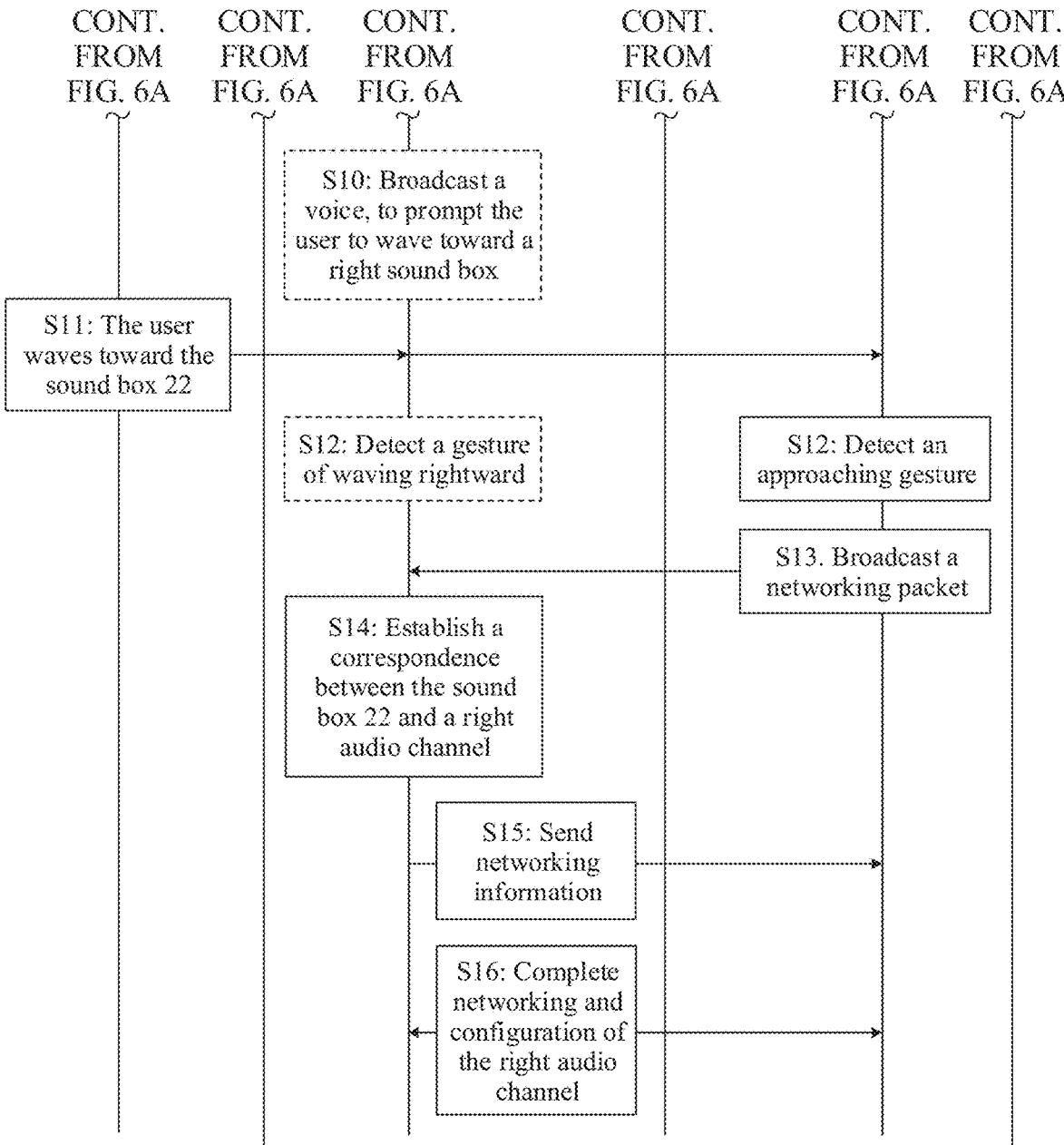

FIG. 6A and FIG. 6B are a diagram of an example of device interaction in a device networking and audio channel configuration method according to an embodiment of this application.

For ease of description, in embodiments shown in FIG. 6A and FIG. 6B, the scenario in which the plurality of devices form the surround stereo shown in FIG. 1(*b*) is still used as an example to describe in detail a procedure in which the sound box 11, the sound box 21, and the sound box 22 perform device networking and audio channel configuration. For detailed descriptions of the scenario shown in FIG. 1(*b*), refer to embodiments in FIG. 3 and corresponding text descriptions. Details are not described herein again. It should be understood that, FIG. 6A and FIG. 6B are merely used as an example for describing the method provided in this embodiment of this application. A person skilled in the art may obtain, by analogy based on embodiments in FIG. 6A and FIG. 6B, a specific implementation in a scenario in which a plurality of other devices form a surround stereo. A procedure shown in FIG. 6A and FIG. 6B may include S1 to S16. Details are as follows.

S1: Determine the sound box 11 as a primary sound box.

In some embodiments, a user may determine the sound box 11 as the primary sound box by operating a terminal device. An application associated with a sound box is installed on the terminal device, for example, a sound box app or an AI Life app. With the use of the application associated with the sound box, the terminal can communicate with the sound box, or the terminal device can communicate with a server (for example, a sound box server or an AI Life server) associated with the sound box, so that the terminal device can control the sound box and exchange data with the sound box.

In some embodiments, the user determines the sound box 11 as the primary sound box by operating a user interface of the terminal device. For a possible implementation of the user interface of the terminal device, refer to related descriptions of FIG. 2(*a*) to FIG. 2(*c*) and the text part. Details are not described herein again.

In some embodiments, if the terminal device supports a directional device sensing function, the user may hold the terminal device and point the terminal device to a sound box (for example, the sound box 11) that the user wants to use as a primary sound box, so that the terminal device senses that the terminal device points to the sound box 11, and the terminal device may determine the sound box 11 as the primary sound box. In a possible implementation, the directional device sensing function is implemented by using an ultra-wideband (ultra-wideband, UWB) technology.

In addition to operating the terminal device, the user may determine the sound box 11 as the primary sound box in another manner. A specific implementation of determining the sound box 11 as the primary sound box is not limited in embodiments of this application.

In some embodiments, after the sound box 11 is determined as the primary sound box, one or more of the terminal device, the server, and/or the sound box 11 may record a correspondence between the sound box 11 and the primary sound box, for example, add a primary sound box identifier to device information of the sound box 11. In this way, the terminal device and/or the server may indicate, based on the primary sound box identifier, the sound box 11 to perform a step that should be performed by the primary sound box in the procedure of device networking and audio channel configuration, and the sound box 11 may enable, based on the primary sound box identifier, a function that should be enabled by the primary sound box in the procedure of device networking and audio channel configuration, and perform related steps.

S2: The sound box 11, the sound box 21, and the sound box 22 start the procedure of device networking and audio channel configuration.

In some embodiments, memories of the sound box 11, the sound box 21, and the sound box 22 store a computer program used for implementing the procedure of device networking and audio channel configuration. The computer program includes instructions. Processors of the sound box 11, the sound box 21, and the sound box 22 read the computer program from the memories and execute the instructions to start the procedure of device networking and audio channel configuration and implement corresponding functions. The computer program may be pre-configured when a device is delivered from a factory, or may be downloaded by the device through firmware upgrade.

In some embodiments, trigger conditions for the sound box 11, the sound box 21, and the sound box 22 to start the procedure of device networking and audio channel configuration may include but are not limited to the following: the sound box 11, the sound box 21, and the sound box 22 receive a button operation; the terminal device or the server sends a procedure start indication to the sound box 11, the sound box 21, and the sound box 22; the sound box 11, the sound box 21, and the sound box 22 are powered on; or the like. That the terminal device or the server sends a procedure start indication to the sound box 11, the sound box 21, and the sound box 22 may be triggered by the user by operating the terminal device.

In some embodiments, when the sound box 11 used as the primary sound box starts the procedure of device networking and audio channel configuration, the sound box 11 may correspondingly execute, based on a primary sound box identity of the sound box 11, instructions that should be executed by the primary sound box. For example, the sound box 11 enables an ultrasonic gesture recognition module, configured to accurately recognize a gesture of waving leftward or waving rightward. The sound box 11 may further start a broadcast packet monitoring process, configured to monitor whether a networking packet broadcast and sent by another device exists in a local area network, so that when the sound box 11 receives a networking packet, the sound box 11 may parse and respond to the networking packet.

In some embodiments, when the sound box 21 and the sound box 22 start the procedure of device networking and audio channel configuration, because the sound box 21 and the sound box 22 are not primary sound boxes, for example, device information of the sound box 21 and the sound box 22 includes no primary sound box identifier, the sound box 21 and the sound box 22 correspondingly execute instructions that should be executed by a non-primary sound box. For example, the sound box 21 and the sound box 22 enable an ultrasonic gesture recognition module, configured to accurately recognize an approaching gesture. The sound box 21 and the sound box 22 may further start a broadcast packet sending process, configured to broadcast a networking packet in the local area network after an approaching gesture is detected, so that the primary sound box (the sound box 11) may send, in response to the networking packet, networking information to the sound box 21 and the sound box 22, and the sound box 21 and the sound box 22 implement networking with the primary sound box based on the networking information.

S3: The sound box 11 prompts, by broadcasting a voice, the user to wave toward a left sound box. This step is optional.

In some embodiments, the sound box 11 stores a preset text-to-speech (text to speech, TTS) audio file, and the sound box 11 plays the TTS audio file in response to execution of preset computer instructions, to implement a function of prompting the user to wave toward the left sound box. For example, the sound box 11 broadcasts "Please stand in the middle of the left sound box and the right sound box, face the primary sound box, and wave your hand toward the left sound box once". If the sound box 11 does not detect a gesture of waving leftward, the sound box 11 may broadcast "No waving action detected. Please increase your action amplitude or get closer to the primary sound box, and wave your hand toward the left sound box once again". If the sound box 11 cannot identify whether the user waves leftward or rightward because the user waves back and forth several times, the sound box 11 may broadcast "Recognition failed. Please wave your hand toward the left sound box once again, and remember to wave your hand only once", and the like.

It should be understood that, a voice broadcasting manner in which the sound box 11 prompts the user to wave toward the left sound box is merely used as a possible implementation. A specific implementation of prompting the user to wave toward the left sound box is not limited in embodiments of this application.

In some embodiments, step S3 may alternatively be as follows: The terminal device prompts, by displaying prompt information or broadcasting a voice, the user to wave toward a left sound box; or the sound box 11 prompts, by flashing an indicator light in a preset manner, the user to wave toward a left sound box; or the like.

In some implementations, step S3 may not be performed. For example, a multi-device networking and audio channel configuration method may be disclosed by a device manufacturer to a user in a form of a product user manual. The user actively reads the product user manual to understand the device networking and audio channel configuration method, to wave toward a left sound box at a proper time.

S4: The user waves toward the sound box 21.

In some embodiments, the user knows, based on the voice broadcast by the sound box 11, an operation to be performed, so that the user stands at a middle location of the left sound box and the right sound box, faces the primary sound box, and waves toward the left sound box once. As described above, in this embodiment of this application, the scenarios shown in FIG. 1(b) and FIG. 3 are used as examples, and the sound box 21 is a sound box located on a left side of the primary sound box. Therefore, the user waves toward the sound box 21.

S5: The sound box 11 detects a gesture of waving leftward (optional), and the sound box 21 detects an approaching gesture.

In some embodiments, as described above, the sound box 11, the sound box 21, and the sound box 22 all enable ultrasonic gesture recognition modules, and the sound box 11, the sound box 21, and the sound box 22 send ultrasonic waves by using their respective speakers and receive ultrasonic echoes in real time by using their respective microphones, to implement a gesture recognition function. For a specific implementation of the gesture recognition function, refer to a conventional technology, or refer to related descriptions in the foregoing part in embodiments of this application. A specific manner used to implement the ultrasonic gesture recognition function is not limited in embodiments of this application.

In some embodiments, the sound box 11 detects the gesture of waving leftward, and the sound box 11 determines, based on this leftward waving action, that an audio channel to be configured this time is a left audio channel. The sound box 21 detects the approaching gesture, and the sound box 21 broadcasts a networking packet in the local area network in response to detecting the approaching gesture. In this way, the sound box 11 may determine a device (the sound box 21) corresponding to a networking packet that is first received after the gesture of waving leftward is detected as a device configured to play audio of the left audio channel.

In some embodiments, if the sound box 11 performs step S3, the sound box 11 may determine that an audio channel to be configured this time is a left audio channel based on the broadcast voice for prompting the user to wave toward the left sound box in step S3 and based on an assumption that the user performs a correct operation based on the broadcast voice (that is, the user waves toward the left sound box based on prompt information about waving toward the left sound box). In this implementation, the sound box 11 may have no ultrasonic gesture recognition function, or may not enable the ultrasonic gesture recognition module. In this implementation, after the sound box 11 plays, through voice broadcasting, the audio file prompting the user to wave toward the left sound box, the user waves toward the left sound box (the sound box 21), and the sound box 21 detects an approaching gesture, and broadcasts a networking packet in response to detecting the approaching gesture. In this way, the sound box 11 may determine a device (the sound box 21) corresponding to a networking broadcast packet that is first received after voice broadcasting as a device configured to play audio of the left audio channel.

S6: The sound box 21 broadcasts a networking packet.

As described in related descriptions in step S5, in some embodiments, the sound box 21 broadcasts the networking packet in the local area network in response to detecting the approaching gesture, so that the sound box 11 learns of a device that detects an approaching gesture this time, and the sound box 11 configures the device that detects the approaching gesture this time as a device configured to play audio of the left audio channel.

In some embodiments, the networking packet broadcast by the sound box 21 may carry one or more types of the following information: a device identifier, a device type, and an IP address of the sound box 21, and the like. The device identifier may be, for example, a media access control (media access control, MAC) address or a universally unique identifier (universally unique identifier, UUID). The device type may be, for example, indication information indicating that the sound box 21 has an audio play capability, or a device model number (for example, "Sound X") of the sound box 21.

In some embodiments, the networking packet broadcast by the sound box 21 may be a CoAP packet based on a constrained application protocol (constrained application protocol, CoAP). A specific protocol used to implement packet exchange is not limited in embodiments of this application.

In some embodiments, step S6 may alternatively be as follows: The sound box 21 multicasts a networking packet. Specifically, the sound box 21 multicasts the networking packet in the local area network in response to detecting the approaching gesture, so that a device that is in the local area network and that can receive a packet from a multicast address can receive and process the networking packet. For example, a device having an audio play capability in the local area network is a device that can receive a packet from a multicast address, and a device having no audio play capability in the local area network cannot receive a packet from a multicast address. In a multicast manner, the sound box 21 may send the networking packet only to the device having the audio play capability. This can ensure that devices participating in stereo networking are devices having the audio play capability.

S7: The sound box 11 establishes a correspondence between the sound box 21 and the left audio channel.

In some embodiments, the networking packet may carry one or more types of the following information: the device identifier, the device type, and the IP address of the sound box 21, and the like. In this way, the sound box 11 learns, based on the information, that the networking packet is sent by the sound box 21.

In some embodiments, the sound box 11 determines, through ultrasonic gesture recognition, that the gesture of waving leftward is detected, and further determines that a sending device (the sound box 21) of the broadcast packet received this time should be configured to play audio of the left audio channel. Optionally, in some implementations, the sound box 11 may first determine whether a time difference between a moment at which it is determined that the gesture of waving leftward is detected and a moment at which the broadcast packet of the sound box 21 is received is less than preset duration. If it is determined that the time difference is less than the preset duration, the sound box 11 determines that the sound box 21 should be configured to play audio of the left audio channel. In this way, it can be ensured that sending of the broadcast packet by the sound box 21 and detection of the gesture of waving leftward by the sound box 11 are triggered by a same hand wave of the user (that is, the hand wave of the user toward the sound box 21), to avoid incorrect configuration.

In some embodiments, the sound box 11 determines, based on the previously broadcast voice for prompting the user to wave toward the left sound box, that a sending device (the sound box 21) of the broadcast packet received this time should be configured to play audio of the left audio channel.

In this way, the sound box 11 establishes the correspondence between the sound box 21 and the left audio channel.

In some embodiments, a processor of the sound box 11 writes a record to a memory of the sound box 11, to record that there is a correspondence between the device identifier of the sound box 11 and the left audio channel. The sound box 11 determines, based on the record, to send audio of the left audio channel in audio files of a plurality of audio channels to the sound box 21.

In some embodiments, the sound box 11 sends an audio channel configuration message to the sound box 21, to notify the sound box 21 to play audio of the left audio channel. The sound box 21 may record its own audio channel configuration parameter as "left" based on the audio channel configuration message. In this way, when receiving audio files of a plurality of audio channels, the sound box 21 can play audio of the left audio channel in the audio files of the plurality of audio channels.

S8: The sound box 11 sends networking information to the sound box 21.

In some embodiments, the networking packet broadcast by the sound box 21 in step S6 carries an address of the sound box 21, for example, the IP address of the sound box 21. Therefore, in step S8, the sound box 11 may send the networking information of the sound box 11 to the address, that is, send the networking information of the sound box 11 to the sound box 21.

In some embodiments, the networking information may include one or more types of the following information: a name of the sound box 11, a MAC address of the sound box 11, a networking password of the sound box 11, a MAC address of the sound box 21, and the like.

In some embodiments, the networking information may be used for establishment of a networking connection between the sound box 11 and the sound box 21, and the networking connection may be established in one or more of the following manners. Bluetooth, Wi-Fi, ZigBee, and the like. In some embodiments, a form of the networking connection may be a P2P (peer to peer) peer-to-peer network connection, or may be an access point (access point, AP) to station (station, STA) network connection.

It should be understood that, in embodiments of this application, specific content and a form of the networking information are not limited, and a manner and a form of establishing the networking connection between the sound box 11 and the sound box 21 are not limited. It should be further understood that, a performing sequence of step S7 and step S8 is not limited in embodiments of this application, and step S8 may be performed before step S7.

S9: The sound box 11 and the sound box 21 complete networking and configuration of the left audio channel.

In some embodiments, the sound box 11 and the sound box 21 may complete networking configuration based on the networking information. In a process of establishing the networking connection, the sound box 11 and the sound box 21 may exchange packets for one or more times. A specific implementation of the networking connection establishment process is not limited in embodiments of this application.

In some embodiments, after networking between the sound box 11 and the sound box 21 is completed, a data transmission link and a control link may exist between the sound box 11 and the sound box 21. Generally, the two links may be two different links, or certainly, may be a same link. The data transmission link may be used to transmit data, for example, a to-be-played audio file. The control link may be used to transmit a control instruction, for example, pause, stop, volume increase, or volume decrease.

In some embodiments, the data transmission link and/or the control link between the sound box 11 and the sound box 21 may be implemented according to a socket (socket) protocol.

In some embodiments, the configuration of the left audio channel may include: the sound box 11 may send an audio file of the left audio channel to the sound box 21 through the data transmission link, so that the sound box 21 plays the received audio file of the left audio channel.

In some embodiments, the configuration of the left audio channel may include: the sound box 11 may send a control instruction for playing the left audio channel to the sound box 21 through the control link, and the sound box 21 may record information about playing the left audio channel in a memory of the sound box 21. Therefore, after receiving an audio file and determining that the audio file is an audio file of the left audio channel, the sound box 21 plays the audio file. Alternatively, if the audio file includes audio files of a plurality of audio channels, the sound box 21 selects an audio file of the left audio channel from the audio files for playing.

So far, device networking and audio channel configuration between the primary sound box and the left sound box have been completed. The primary sound box and the left sound box are connected, and the networking and the configuration of the left audio channel are completed.

Next, device networking and audio channel configuration between the primary sound box and the right sound box are performed in S10 to S16.

S10: The sound box 11 prompts, by broadcasting a voice, the user to wave toward the right sound box. This step is optional.

S11: The user waves toward the sound box 22 based on prompt information in the broadcast voice.

S12: The sound box 11 detects a gesture of waving rightward, and the sound box 22 detects an approaching gesture.

S13: The sound box 22 broadcasts a networking packet in response to detecting the approaching gesture.

S14: The sound box 11 establishes a correspondence between the sound box 22 and a right audio channel.

S15: The sound box 11 sends networking information to the sound box 22.

S16: The sound box 11 and the sound box 22 complete networking and configuration of the right audio channel.

S3 to S9 are steps of performing networking and configuration of the left audio channel between the primary sound box and the left sound box. S10 to S16 are steps of performing networking and configuration of the right audio channel between the primary sound box and the right sound box. Therefore, for specific descriptions of each step in S10 to S16, refer to descriptions of a related step in S3 to S9. Analogies can be made and details are not described herein again.

As described above, in some scenarios, there may be more than three devices involved in device networking and audio channel configuration. For example, in the scenario shown in FIG. 1(e), the large screen 12 is used as a primary device, and the sound box 21, the sound box 22, the sound box 23, and the sound box 24 are used as secondary devices (optionally, the sound box 25 that is used as a secondary device may be further included), and separately establish a networking connection to the large screen 12. The large screen 12 configures an audio channel for each secondary device. In this scenario, a procedure of device networking and audio channel configuration is similar to that in embodiments shown in FIG. 6A and FIG. 6B. A difference is as follows. In step S5, the large screen 12, as the primary device, may need to recognize gestures of waving toward a front-left direction, a front-right direction, a rear-left direction, and a rear-right direction (optionally, a gesture of waving toward a middle-front direction may be further included).

In some embodiments, if a primary device that performs device networking and audio channel configuration has a camera, the primary device may also determine, by performing image recognition on an image captured by the camera, a secondary device toward which the user waves each time. For example, in the scenario shown in FIG. 1(e), if the large screen 12 has a camera, the large screen 12 may identify, by performing image recognition on an image captured by the camera, whether the user waves toward the sound box 21, the sound box 22, the sound box 23, the sound box 24, or the sound box 25.

Figures 7, 8:
FIG. 7 is a diagram of functional modules of an electronic device according to an embodiment of this application.
FIG. 8 is a diagram of functional modules of an audio device according to an embodiment of this application.

FIG. 7 is a diagram of an example of functional modules of an electronic device according to an embodiment of this application. As shown in FIG. 7, the electronic device 70 includes a gesture detection module 71, a packet monitoring module 72, and an audio channel configuration module 73.

The gesture detection module 71 may be configured to detect a waving gesture of a user, and determine a direction of the waving gesture of the user, for example, determine whether a waving action of the user is waving leftward or waving rightward. In some embodiments, the gesture detection module 71 may implement the function through ultrasonic gesture recognition. In some embodiments, if the electronic device 70 includes an image capture apparatus, the gesture detection module 71 may implement the function through image recognition.

The packet monitoring module 72 may be configured to monitor whether a networking packet that is sent by another device and that conforms to a preset format exists in a local area network in which the electronic device 70 is located, and when a networking packet conforming to the preset format is detected through monitoring, receive and report the networking packet.

The audio channel configuration module 73 may be configured to: when the packet monitoring module 72 detects, through monitoring, a networking packet conforming to a preset format after the gesture detection module 71 detects a waving action toward a specific direction, establish a correspondence between an audio channel corresponding to the direction and a sending device of the networking packet, and configure the sending device of the networking packet to play audio of the audio channel corresponding to the direction. For example, when the packet monitoring module 72 detects, through monitoring, a networking packet conforming to the preset format after the gesture detection module 71 detects a gesture of waving leftward, the audio channel configuration module 73 establishes a correspondence between a left audio channel and a sending device of the networking packet, and configures the sending device of the networking packet to play audio of the left audio channel.

FIG. 8 is a diagram of an example of functional modules of an audio device according to an embodiment of this application. As shown in FIG. 8, the electronic device 80 includes a gesture detection module 81, a packet sending module 82, and an audio play module 83.

The gesture detection module 81 may be configured to detect a waving gesture of approaching the audio device 80 of a user, and in response to detecting the waving gesture of approaching the audio device 80, notify the packet sending module 82 to send a networking packet. In some embodiments, the networking packet may be a networking packet conforming to the preset format in embodiments shown in FIG. 7.

The packet sending module 82 may be configured to: when the gesture detection module 81 detects a waving gesture of approaching the audio device 80, broadcast a networking packet in a local area network in which the audio device 80 is located, for example, broadcast a networking packet conforming to the preset format.

The audio play module 83 may be configured to play audio of a preset audio channel after receiving audio sent by the electronic device 70. In some embodiments, the audio sent by the electronic device 70 includes only the audio of the preset audio channel, and the audio play module 83 may directly play the received audio. In some embodiments, the audio play module 83 receives an audio channel configuration message sent by the electronic device 70, the audio channel configuration message indicates audio of a specific audio channel that should be played by the audio device 80, and based on this, the audio play module 83 may select the audio of the corresponding audio channel from the received audio for playing.

A person of ordinary skill in the art may be aware that, the example units and algorithm steps described with reference to embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it shall not be considered that the implementation goes beyond the scope of this application.

In embodiments provided in this application, it should be understood that the disclosed apparatus/electronic device and method may be implemented in other manners. For example, the described apparatus/electronic device embodiment is merely an example. For example, division into the modules or the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electrical, mechanical, or other forms.

The units described as separate parts may or may not be physically separate, and the parts displayed as units may or may not be physical units, may be located in one position, or may be distributed on a plurality of network units. Some or all of the units may be selected according to an actual requirement, to achieve the objectives of the solutions of embodiments.

In addition, the functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated module/unit is implemented in the form of a software functional unit and sold or used as an independent product, the integrated module/unit may be stored in a computer-readable storage medium. Based on such an understanding, in this application, all or some of the procedures of the methods in the foregoing embodiments may be implemented by a computer program instructing related hardware. The computer program may be stored in a computer-readable storage medium. When the computer program is executed by a processor, the steps in the method embodiments can be implemented. The computer program includes computer program code. The computer program code may be in a source code form, an object code form, an executable file form, an intermediate form, or the like. The computer-readable storage medium may include any entity or apparatus that can carry the computer program code, a recording medium, a USB flash drive, a removable hard disk, a magnetic disk, a compact disc, a computer memory, a read-only memory (ROM, Read-Only Memory), a random access memory (RAM, Random Access Memory), an electrical carrier signal, a telecommunication signal, a software distribution medium, and the like. It should be noted that content included in the computer-readable storage medium may be appropriately added or deleted according to requirements of legislation and patent practice in a jurisdiction. For example, in some jurisdictions, according to legislation and patent practice, the computer-readable storage medium does not include the electrical carrier signal or the telecommunication signal.

In conclusion, it should be noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A device networking and audio channel configuration method, applied to a system comprising a first electronic device and at least one audio device, wherein the method comprises:

sending, by an audio device of the at least one audio device, a networking packet in response to detecting a first gesture, wherein the first gesture is a waving gesture;

receiving, by the first electronic device, the networking packet;

determining, by the first electronic device, a direction of the waving gesture;

determining an audio channel of the audio device to be an audio channel having a spatial orientation that is the same as the direction of the waving gesture;

establishing, by the first electronic device, a correspondence between the audio device corresponding to the networking packet and the audio channel, the established correspondence allowing the audio device corresponding to the networking packet to be configured to play audio of the audio channel; and establishing, by the first electronic device, a networking connection to the audio device.

2. The method according to claim 1, wherein the determining, by the first electronic device, a direction of the waving gesture comprises at least one of:

determining, by the first electronic device, the direction corresponding to the first gesture through gesture recognition; or before the first electronic device establishes the correspondence:

sending, by the first electronic device, prompt information that is used to prompt a user to wave toward the audio device; and determining, by the first electronic device, the direction corresponding to the first gesture based on the prompt information.

3. The method according to claim 1, wherein the audio device comprises a speaker and a microphone, the speaker is configured to send an ultrasonic wave, the microphone is configured to receive an ultrasonic echo corresponding to the ultrasonic wave, and the detecting, by the audio device, a first gesture comprises:

detecting, by the audio device, the first gesture based on the ultrasonic wave and the ultrasonic echo according to a Doppler frequency shift principle.

4. The method according to claim 1, wherein the first electronic device and the audio device are located in a same local area network, and the sending, by the audio device, a networking packet comprises:

broadcasting, by the audio device, the networking packet in the local area network.

5. The method according to claim 1, wherein the method further comprises:

sending, by the first electronic device, to-be-played audio to the audio device through the networking connection.

6. The method according to claim 1, wherein the networking packet carries at least one of a device type identifier or an internet protocol (IP) address of the audio device.

7. The method according to claim 1, wherein the determining an audio channel of the audio device to be an audio channel having a spatial orientation that is the same as the direction of the waving gesture comprises:

when the direction of the waving gesture is left, determining that the audio channel of the audio device is a left audio channel; or when the direction of the waving gesture is right, determining that the audio channel of the audio device is a right audio channel.

8. The method according to claim 1, wherein the determining, by the first electronic device, a direction of the waving gesture comprises:

determining the direction of the waving gesture by using an ultrasonic gesture recognition technology.

9. A device networking and audio channel configuration method, applied to a system comprising at least a first electronic device, a first audio device, and a second audio device, wherein the method comprises:

broadcasting, by the first audio device, a first networking packet in response to detecting a first approaching gesture;

receiving, by the first electronic device, the first networking packet;

determining, by the first electronic device, that the first approaching gesture is a gesture toward a first direction, wherein the first direction corresponds to a first audio channel, wherein the first approaching gesture is a waving gesture;

determining an audio channel of the first audio device to be an audio channel having a spatial orientation that is the same as the first direction;

establishing, by the first electronic device, a correspondence between the first audio device and the first audio channel to allow the first audio device to be configured to play audio of the first audio channel;

establishing, by the first electronic device, a first networking connection to the first audio device;

broadcasting, by the second audio device, a second networking packet in response to detecting a second approaching gesture;

receiving, by the first electronic device, the second networking packet;

determining, by the first electronic device, that the second approaching gesture is a gesture toward a second direction, wherein the second direction corresponds to a second audio channel;

establishing, by the first electronic device, a correspondence between the second audio device and the second audio channel to allow the second audio device to be configured to play audio of the second audio channel; and establishing, by the first electronic device, a second networking connection to the second audio device.

10. The method according to claim 9, wherein the method further comprises:

sending, by the first electronic device, the audio of the first audio channel to the first audio device through the first networking connection; and sending, by the first electronic device, the audio of the second audio channel to the second audio device through the second networking connection.

11. The method according to claim 9, wherein the method further comprises:

sending, by the first electronic device, a first indication message to the first audio device, wherein the first indication message indicates the first audio device to play the audio of the first audio channel; and sending, by the first electronic device, a second indication message to the second audio device, wherein the second indication message indicates the second audio device to play the audio of the second audio channel.

12. The method according to claim 9, wherein when the first audio device is placed on a left side of the first electronic device and the second audio device is placed on a right side of the first electronic device, the first approaching gesture is a gesture of waving toward the first audio device, the second approaching gesture is a gesture of waving toward the second audio device, the first direction is left, the second direction is right, the first audio channel is a left audio channel, and the second audio channel is a right audio channel.

13. The method according to claim 9, wherein the determining an audio channel of the first audio device to be an audio channel having a spatial orientation that is the same as the first direction comprises:

when the first direction is left, determining that the audio channel of the first audio device is a left audio channel; or when the first direction is right, determining that the audio channel of the first audio device is a right audio channel.

14. The method according to claim 9, wherein the determining, by the first electronic device, that the first approaching gesture is a gesture toward a first direction comprises:

determining the first direction by using an ultrasonic gesture recognition technology.

15. An electronic device, comprising:

at least one processor; and one or more memories coupled to the at least one processor and storing programming instructions for execution by the at least one processor to:

detect a waving gesture, and monitor whether a networking packet in a preset format exists in a local area network;

determine a direction of the waving gesture; and when a first networking packet conforming to the preset format is received from an audio device after the waving gesture is detected;

determine an audio channel of an audio device to be an audio channel having a spatial orientation that is the same as the direction of the waving gesture; and configure the audio device that sends the first networking packet to play audio of the audio channel.

16. The electronic device according to claim 15, wherein determining the audio channel of the audio device to be the audio channel having the spatial orientation that is the same as the direction of the waving gesture comprises:

when the direction of the waving gesture is left, determining that the audio channel of the audio device is a left audio channel; or when the direction of the waving gesture is right, determining that the audio channel of the audio device is a right audio channel.

17. The electronic device according to claim 15, wherein determining the direction of the waving gesture comprises:

determining the direction of the waving gesture by using an ultrasonic gesture recognition technology.

18. An audio device, comprising:

at least one processor; and one or more memories coupled to the at least one processor and storing programming instructions for execution by the at least one processor to:

detect an approaching gesture, and broadcast a networking packet in a preset format after the approaching gesture is detected, wherein a direction of the approaching gesture is determined, and wherein an audio channel of the audio device is determined to be an audio channel having a spatial orientation that is the same as the direction of the approaching gesture;

establish a networking connection to an electronic device that receives the networking packet in the preset format; and receive audio of the audio channel sent by the electronic device, and play the audio of the audio channel.

19. The audio device according to claim 18, wherein:

when the direction of the approaching gesture is left, the audio channel of the audio device is determined to be a left audio channel; or when the direction of the approaching gesture is right, the audio channel of the audio device is determined to be a right audio channel.

20. The audio device according to claim 18, wherein the direction of the approaching gesture is determined by using an ultrasonic gesture recognition technology.

* * * * *